(12) United States Patent
Segura Puchades

(10) Patent No.: US 12,532,088 B2
(45) Date of Patent: Jan. 20, 2026

(54) EVENT-DRIVEN HIGH DYNAMIC RANGE IMAGE SENSOR AND METHOD

(71) Applicant: Commissariat à l'Energie Atomique et aux Energies Alternatives, Paris (FR)

(72) Inventor: Josep Segura Puchades, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 46 days.

(21) Appl. No.: 18/721,120

(22) PCT Filed: Dec. 28, 2022

(86) PCT No.: PCT/EP2022/087928
§ 371 (c)(1),
(2) Date: Jun. 17, 2024

(87) PCT Pub. No.: WO2023/126424
PCT Pub. Date: Jul. 6, 2023

(65) Prior Publication Data
US 2025/0071436 A1    Feb. 27, 2025

(30) Foreign Application Priority Data

Dec. 29, 2021   (FR) ...................................... 2114600

(51) Int. Cl.
*H04N 25/47*    (2023.01)
*H04N 25/587*   (2023.01)
(Continued)

(52) U.S. Cl.
CPC ........... *H04N 25/47* (2023.01); *H04N 25/587* (2023.01); *H04N 25/707* (2023.01); *H04N 25/772* (2023.01)

(58) Field of Classification Search
CPC .... H04N 25/47; H04N 25/587; H04N 25/707; H04N 25/77; H04N 25/772; H04N 25/78
See application file for complete search history.

(56) References Cited

U.S. PATENT DOCUMENTS

2002/0113887 A1   8/2002   Iimura
2007/0109434 A1   5/2007   Puchades
(Continued)

OTHER PUBLICATIONS

International Search Report and Written Opinion for application No. PCT/EP2022/087928; mailed on Feb. 23, 2023; 15 pages.

*Primary Examiner* — Daniel M Pasiewicz
(74) *Attorney, Agent, or Firm* — Jordan IP Law LLC

(57) ABSTRACT

A pixel circuit of an image sensor comprises a pinned photodiode (PD) coupled to a sense node (SN); a comparator (104) configured: to compare, during a first read phase, a first sense node voltage (Vpix) at the sense node (SN) with a first voltage ramp (V_RAMP) and to generate an event signal (EVENT) if the voltage of the first voltage ramp (V_RAMP) crosses the first sense node voltage (Vpix); and otherwise, to compare, during a second read phase, a second sense node voltage (Vpix) at the sense node (SN), with a second voltage ramp (V_RAMP) and to generate an event signal (EVENT) when the voltage of the second voltage ramp (V_RAMP) crosses the second sense node voltage (Vpix); and an event signaling circuit (1102) configured to signal the generation of the event signal during the first or second read phase to event logging circuitry.

17 Claims, 14 Drawing Sheets

(51) Int. Cl.
H04N 25/707 (2023.01)
H04N 25/772 (2023.01)

(56) References Cited

U.S. PATENT DOCUMENTS

| | | | |
|---|---|---|---|
| 2008/0106622 A1* | 5/2008 | Turchetta | H04N 25/57 |
| | | | 348/E3.018 |
| 2019/0098242 A1* | 3/2019 | Mori | H04N 25/79 |
| 2020/0228745 A1 | 7/2020 | Otaka | |
| 2024/0107189 A1* | 3/2024 | Guo | H04N 25/772 |
| 2025/0071438 A1* | 2/2025 | Segura Puchades | |
| | | | H04N 25/707 |

* cited by examiner

EVENT-DRIVEN HIGH DYNAMIC RANGE IMAGE SENSOR AND METHOD

FIELD

The present disclosure relates generally to the field of image sensors, and in particular to CMOS image sensors having pinned photodiodes.

BACKGROUND

There is continual progression in the field of CMOS image sensors towards smaller pixels, particularly with the widely adopted stacked-3D integration techniques. Smaller pixels mean smaller photodiodes, which in turn leads to a lower capacity to store photogenerated charges. The result is that sensor saturation is reached at lower illuminance levels, and the dynamic range is thus poor.

Providing image sensors with high dynamic range is of particular importance for achieving satisfactory image quality. Indeed, within a typical scene there is often a considerable variation in the illuminance levels from the brightest to the darkest regions. A low dynamic range can cause saturation of pixels in the high illuminance image regions, which is not only inconvenient for the concerned pixels, but it can also lead to the photogenerated charges from saturated pixels migrating to surrounding pixels, leading to undesirable image quality degradation.

While solutions have been proposed in the past for improving the dynamic range of CMOS image sensors, these solutions tend to fall into two categories: 1) solutions that modify the pixel layout, generally leading to greater complexity and/or increased pixel circuit area; or 2) solutions based on multiple exposures that can suffer from drawbacks such as ghost effects and misalignment issues in the case of acquisitions that are not time-correlated, as well as requiring a readout with a post-process operation that costs chip area and leads to increased power consumption.

SUMMARY

It is an aim of embodiments of the present disclosure to at least partially address one or more drawbacks in the prior art.

According to one aspect, there is provided a pixel circuit of an image sensor, the pixel circuit comprising: a pinned photodiode coupled to a sense node; a comparator configured: to compare, during a first read phase, a first sense node voltage at the sense node, resulting from a first integration period of the pinned photodiode, with a first voltage ramp and to generate an output signal if the voltage of the first voltage ramp crosses the first sense node voltage; and if the voltage of the first voltage ramp does not cross the first sense node voltage during the first read phase, to compare, during a second read phase, a second sense node voltage at the sense node, resulting from the first integration period and a second integration period of the pinned photodiode, with a second voltage ramp and to generate an output signal when the voltage of the second voltage ramp crosses the second sense node voltage; and a memory configured to receive a digital ramp, and to store, in response to the output signal of the comparator during the first or second read phase, a value of the digital ramp to form pixel data of the pixel.

According to one embodiment, the pixel circuit further comprises a logic circuit configured to disable the comparator during the second read phase if the output signal is generated during the first read phase.

According to one embodiment, the second ramp signal has a greater amplitude than the amplitude of the first ramp signal.

According to one embodiment, the memory is further configured to receive a digit signal having a first value during the first read phase and a second value during the second read phase, the memory being configured to store, in response to the output signal of the comparator during the first or second read phase, the value of the digit signal.

According to one embodiment, a cathode of the photodiode is coupled to the sense node via a transfer gate, the transfer gate being activated by a first activation pulse at the start of the first read phase and by a second activation pulse at the start of the second read phase, the voltage at the sense node not being reset between the first and second read phases.

According to one embodiment, the pixel circuit further comprises a reset transistor coupling the cathode of the photodiode to a reset voltage rail, and the logic circuit is further configured to activate the reset transistor in response to the output signal of the comparator during the first or second read phase.

According to one embodiment: if the voltage of the second voltage ramp does not cross the second sense node voltage during the second read phase, the comparator is further configured to compare, during a third read phase, a third sense node voltage at the sense node with a third voltage ramp and to generate an output signal when the voltage of the third voltage ramp crosses the third sense node voltage; and the memory is further configured to store, in response to the output signal of the comparator during the third read phase, a value of the digital ramp to form pixel data of the pixel.

According to a further aspect, there is provided an image sensor comprising an array formed of a plurality of the above pixel circuit.

According to one embodiment: the first voltage ramp crosses the first sense node voltage of a first of the pixel circuits during the first read phase, and the memory of the first pixel circuit is configured to store: a first value of the digital ramp corresponding to the first sense node voltage, and the first value of the digital signal; and the second voltage ramp crosses the second sense node voltage of a second of the pixel circuits during the second read phase, and the memory of the second pixel circuit is configured to store: a second value of the digital ramp corresponding to the second sense node voltage, and the second value of the digital signal.

According to one embodiment, the image sensor further comprises an image reconstruction device configured to reconstruct an image by generating: a first pixel value of the image based on the first values stored in the memory of the first pixel circuit; and a second pixel value of the image based on the second values stored in the memory of the second pixel circuit and based on the relative durations of the first and second integration periods.

According to one embodiment, the image sensor further comprises: a counter configured to generate the digital ramp, and to supply the digital ramp to each of the plurality of pixel circuits; and a digital to analog converter configured to convert the digital ramp into the first voltage ramp during the first read phase and into the second voltage ramp during the second read phase.

According to one embodiment, the image sensor further comprises a readout interface configured to read, after the first and second read phases, an image from the image sensor by reading the pixel data from the memory of each pixel circuit.

According to one embodiment, the image sensor comprises first and second stacked tiers, the array of pixel circuits being formed in the first tier, and the comparator being formed in the second tier.

According to one embodiment, the memory is formed in the second tier, or in a third tier of the image sensor stacked with the first and second tiers.

According to a further aspect, there is provided a method of reading a pixel circuit of an image sensor, the pixel circuit comprising a pinned photodiode coupled to a sense node, the method comprising: comparing, by a comparator during a first read phase, a first sense node voltage at the sense node, resulting from a first integration period of the pinned photodiode, with a first voltage ramp and generating, by the comparator, an output signal if the voltage of the first voltage ramp crosses the first sense node voltage; if the voltage of the first voltage ramp does not cross the first sense node voltage during the first read phase, comparing, by the comparator during a second read phase, a second sense node voltage at the sense node, resulting from the first integration period and a second integration period of the pinned photodiode, with a second voltage ramp and generating an output signal when the voltage of the second voltage ramp crosses the second sense node voltage; receiving, by a memory of the pixel circuit, a digital ramp; and storing, in response to the output signal of the comparator during the first or second read phase, a value of the digital ramp to form pixel data of the pixel.

According to a further aspect, there is provided a pixel circuit of an image sensor, the pixel circuit comprising: a pinned photodiode coupled to a sense node; a comparator configured: to compare, during a first read phase, a first sense node voltage at the sense node, resulting from a first integration period of the pinned photodiode, with a first voltage ramp and to generate an event signal if the voltage of the first voltage ramp crosses the first sense node voltage; and if the voltage of the first voltage ramp does not cross the first sense node voltage during the first read phase, to compare, during a second read phase, a second sense node voltage at the sense node, resulting from the first integration period and a second integration period of the pinned photodiode, with a second voltage ramp and to generate an event signal when the voltage of the second voltage ramp crosses the second sense node voltage; and an event signaling circuit configured to signal the generation of the event signal during the first or second read phase to event logging circuitry.

According to one embodiment, the event signaling circuit is further configured to disable the comparator during the second read phase if the event signal is generated during the first read phase.

According to one embodiment, the second ramp signal has a greater amplitude than the amplitude of the first ramp signal.

According to one embodiment, a cathode of the photodiode is coupled to the sense node via a transfer gate, the transfer gate being activated by a first activation pulse at the start of the first read phase and by a second activation pulse at the start of the second read phase, the voltage at the sense node not being reset between the first and second read phases.

According to one embodiment, the pixel circuit further comprises a reset transistor coupling the cathode of the photodiode to a reset voltage rail, and the event signaling circuit is further configured to activate the reset transistor in response to the event signal being generated by the comparator during the first or second read phase.

According to one embodiment, the pixel circuit further comprises a logic device coupled to the output of the comparator and configured to disable the transfer gate in response to the generation of the event signal during the first or second read phase.

According to a further aspect, there is provided an image sensor comprising: an array formed of a plurality of the above pixel circuit; a counter configured to generate the digital ramp, and to supply the digital ramp to an image memory; and a digital to analog converter configured to convert the digital ramp into the first voltage ramp during the first read phase and into the second voltage ramp during the second read phase.

According to one embodiment, the image sensor further comprises an image reconstruction device configured to reconstruct an image by generating: a first pixel value of the image based on a first value of the digital ramp associated with a first of the plurality of pixel circuits; and a second pixel value of the image based on a second value of the digital ramp associated with a second of the plurality of pixel circuits and based on the relative durations of the first and second integration periods.

According to one embodiment, the image sensor further comprises a control circuit configured, during the first and second read phases, to pause the incrementation of the counter at each count value of the digital ramp until a corresponding end of scan signal is asserted by the event logging circuitry indicating that all of the pixel circuits generating the event signal corresponding to the count value have been read.

According to one embodiment, the control circuit is configured to delay a start of the second read phase until all of the pixel circuits having events have been read during the first read phase.

According to one embodiment, the control circuit is configured to implement the first read phase in two parts, a first part after a first integration time, and a second part after a second integration time.

According to one embodiment, the control circuit is configured to generate an image histogram by counting the number of pixel circuits signaling events during each count value of the counter.

According to one embodiment, the image memory is further configured to receive a digit signal having a first value during the first read phase and a second value during the second read phase, the image memory being configured to store, in response to the event signal from one of the pixel circuits during the first or second read phase, the value of the digit signal.

According to one embodiment, each pixel circuit further comprises a register coupled to the output of the comparator and configured to store, in response to the generation of the event signal, a digital signal having a first value during the first read phase and a second value during the second read phase.

According to one embodiment, the image sensor comprises first and second stacked tiers, the array of pixel circuits being formed in the first tier, and the comparator being formed in the second tier.

According to one embodiment, the event signaling circuit is formed in the second tier, or in a third tier of the image sensor stacked with the first and second tiers.

According to a further aspect, there is provided a method of reading a pixel circuit of an image sensor, the pixel circuit comprising a pinned photodiode coupled to a sense node, the method comprising: comparing, by a comparator during a first read phase, a first sense node voltage at the sense node, resulting from a first integration period of the pinned photodiode, with a first voltage ramp and generating, by the comparator, an event signal if the voltage of the first voltage ramp crosses the first sense node voltage; if the voltage of the first voltage ramp does not cross the first sense node voltage during the first read phase, comparing, by the comparator during a second read phase, a second sense node voltage at the sense node, resulting from the first integration period and a second integration period of the pinned photodiode, with a second voltage ramp and generating an event signal when the voltage of the second voltage ramp crosses the second sense node voltage; and signaling, by an event signaling circuit, the generation of the event signal during the first or second read phase to event logging circuitry.

According to one embodiment, the method further comprises: receiving, by an image memory of the image sensor, a digital ramp; and storing, at an address of the image memory associated with the pixel circuit and in response to the event signal of the comparator during the first or second read phase, a value of the digital ramp to form pixel data of the pixel.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

First Aspect—Pixel Circuit with Local Memory

Figure 1:
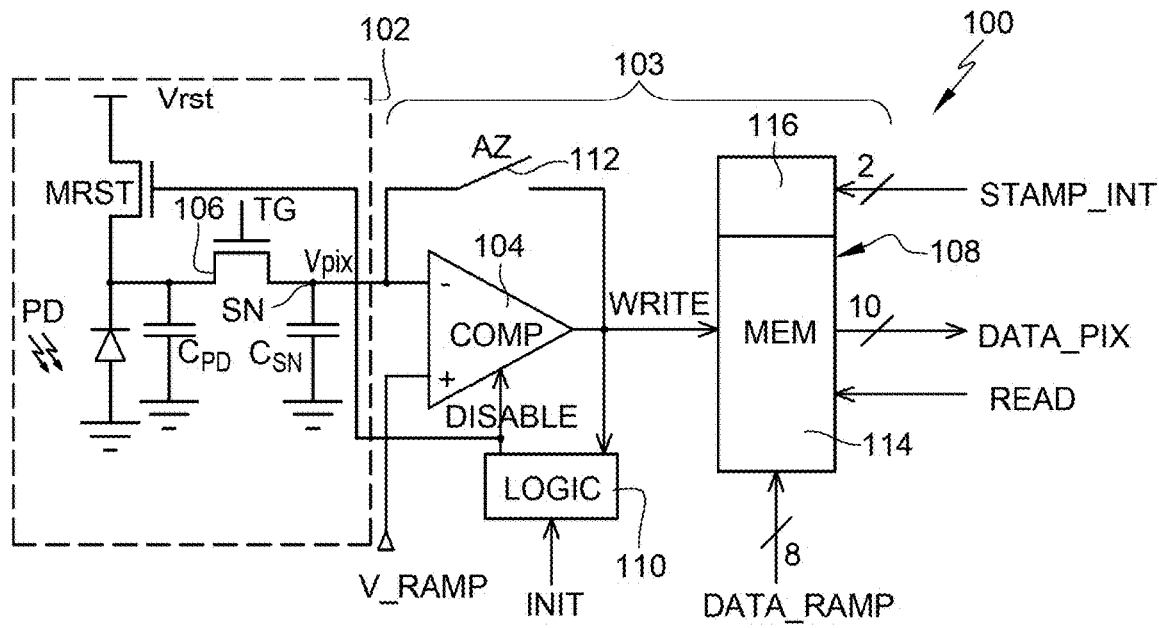
FIG. 1 schematically illustrates a pixel circuit according to example embodiment of the present disclosure.

FIG. 1 schematically illustrates a pixel circuit 100 according to example embodiment of the present disclosure. The pixel circuit 100 comprises a sensor 102 and a readout circuit 103 comprising a comparator (COMP) 104.

The sensor 102 comprises a photodiode PD, which is for example a pinned photodiode, having its anode coupled to a ground rail of the sensor 102, and its cathode coupled to a sense node SN of the sensor 102, for example via a transfer gate 106. The transfer gate 106 is for example controlled by a control signal TG. As known by those skilled in the art, in the field of CMOS image sensors, a transfer gate is a device that permits charge to be transferred from a pinned photodiode to a charge storage region. It should be noted that a transfer gate is not the same as a switch. In particular, unlike a switch, the use of a transfer gate in combination with a pinned photodiode implies that the charge transfer is non-destructive. Thus, multiple activations of the transfer gate can be performed without impacting the value that is read.

In some embodiments, the sensor 102 further comprises a reset transistor MRST coupling the cathode of the photodiode PD to a reset voltage rail Vrst. For example, the reset transistor is a MOS transistor having its source coupled to the reset voltage rail Vrst. The photodiode PD has an associated capacitance $C_{PD}$ between its cathode and anode. The sense node SN also has an associated capacitance $C_{SN}$ with respect to the ground rail of the sensor 102, this capacitance $C_{SN}$ for example resulting from parasitic capacitances, and/or from a capacitor (not illustrated) coupled between the sense node SN and the ground rail.

The readout circuit 103 of the pixel circuit 100 for example comprises, in addition to the comparator 104, a memory (MEM) 108 and a logic circuit (LOGIC) 110.

The comparator 104 for example has a negative input coupled to the sense node SN, and a positive input coupled to an input line of the pixel circuit receiving a voltage ramp V_RAMP. An output of the comparator 104 provides a signal WRITE when the voltage ramp V_RAMP crosses a voltage Vpix present at the sense node SN. The comparator output is for example coupled to a write enable input of the memory 108, to an input of the logic circuit 110, and, via an auto-zero switch 112, to the negative input of the comparator 104. The auto-zero switch 112 is controlled by an auto-zero control signal AZ.

The logic circuit 110 for example receives an initialization signal INIT, and is configured, in response to this command, to initiate the logic circuit 110 in order to, for example, restore the functionalities of the comparator 104 and/or the photodiode PD by setting a disable signal DISABLE to a non-asserted state. The disable signal DISABLE is for example supplied to an enable input of the comparator 104 and/or is used for activating the reset transistor MRST, if present.

The memory 108 for example comprises a first portion 114 configured to receive a digital ramp signal DATA_RAMP, which is an 8-bit signal in the example of FIG. 1, but could have a different number of bits. The memory 108 also for example comprises a second portion 116 configured to receive a digital stamp value STAMP_INT, which is a 2-bit signal in the example of FIG. 1, but could have a different number of bits. The memory 108 also receives a read command signal READ on an input line, and supplies on an output line, in response to the read command READ, a pixel data value DATA_PIX comprising data values held in the first and second memory portions 114, 116. In the example of FIG. 1, the pixel data value DATA_PIX is a 10-bit value, although in alternative embodiments it could have a different number of bits.

In operation, the pixel circuit 100 is capable of performing multiple read phases in order to achieve a relatively high dynamic range. The disable signal DISABLE is for example initially in an asserted state triggered by the activation of the WRITE signal at the comparator output during a previous cycle. This implies that the reset transistor MRST is activated, and the voltage at the cathode of the photodiode PD is at the reset voltage Vrst. The sense node voltage Vpix is initialized to an initial value of the voltage ramp V_RAMP, equal for example to the reset voltage Vrst, or a different voltage, by applying the AZ signal. The transfer gate command signal TG is also for example asserted in order to initialize the photodiode PD. The signal INIT is then for example asserted in order that the logic circuit 110 deactivates the disable signal DISABLE, and the TG command is brought low, causing an integration period to begin.

After a first integration period, a first read phase is initiated by applying a pulse on the transfer gate control signal TG. This causes charges accumulated by the photodiode PD during the first integration period to be transferred to the sense node SN, thereby reducing the sense node voltage as a function of the illumination of the photodiode during the first integration period. Indeed, it is assumed in the present description that the photodiode is of a type that the charge transfer to the sense node is subtractive, i.e. due to a transfer of electrons, and therefore the reset voltage Vrst applied to the sense node SN is high, and is reduced by an amount that is proportional to the quantity of accumulated charges. In alternative embodiments, it would also be possible for the photodiode to be of a type such that the charge transfer to the sense node SN is additive, i.e. due to a transfer of holes, in which case the reset voltage Vrst is a low voltage, and is increased by an amount that is proportional to the quantity of accumulated charges.

The voltage Vpix at the sense node SN is then compared, by the comparator 104, with a first voltage ramp of the signal V_RAMP. The first voltage ramp for example has reduced amplitude with respect to the full range between a lowest saturation voltage Vsat of the pixel circuit, and the reset voltage level Vrst. For example, the first voltage ramp extends from Vsat up to Vsat*M, where M is for example equal to between 0.2 and 0.8, and for example around 0.5. Thus, the conversion time, corresponding to the risetime of the ramp, is reduced with respect to a full voltage ramp.

If the voltage ramp V_RAMP exceeds the value of the sense node voltage Vpix, the signal WRITE at the output of the comparator 104 is asserted. This for example causes the memory 108 to store current values of the digital signals DATA_RAMP and STAMP_INT in the first and second portions 114, 116 respectively. Furthermore, the signal WRITE for example causes the logic circuit 110 to assert the disable signal, thereby disabling the comparator 104 and/or activating the reset transistor MRST to disable the photodiode PD until a subsequent image capture operation, when the INIT command is reasserted.

Alternatively, if the voltage ramp V_RAMP does not exceed the value of the voltage Vpix, the signal WRITE at the output of the comparator 104 is not asserted, and the integration by the photodiode PD continues. Previously transferred charges are thus kept at the Vpix node SN.

One or more further read phases can then be performed in a similar fashion to the first read phase, also with voltage ramps of reduced amplitudes compared to the full range. However, a final read phase is for example performed with a full amplitude ramp, in other words a ramp rising from Vsat to Vrst, ensure that all pixel circuits of the array are read during at least one of the read phases. No reset is performed between one read phase and the next of a same read cycle, and it should be noted that, in the case of a pinned photodiode, the application of the TG pulse is cumulative, and non-destructive. Each phase is associated with a different integration time, and thus it is possible to obtain a high dynamic range reading. Indeed, for pixels with high illumination, the sense node voltage Vpix will be relatively low, and can be read during the first read phase. Pixels receiving lower illuminations will cause smaller drops in the sense node voltage Vpix, and are read during a later read phase, associated with a longer integration time.

Figure 2:
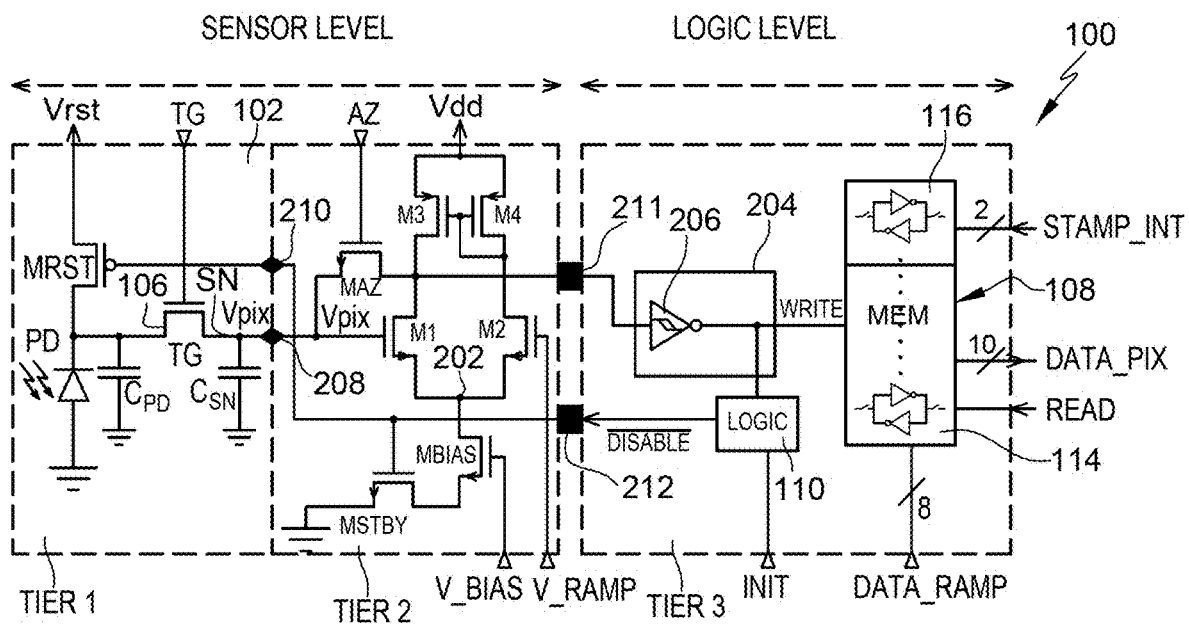
FIG. 2 schematically illustrates the pixel circuit of FIG. 1 in more detail according to an example embodiment of the present disclosure.

FIG. 2 schematically illustrates the pixel circuit 100 of FIG. 1 in more detail according to an example embodiment. The sensor 102 is the same as the example of FIG. 1, except that the reset transistor MRST is implemented as a p-channel MOS (PMOS) transistor.

In the example of FIG. 2, the comparator 104 comprises a first stage implemented by n-channel MOS (NMOS) transistors M1, M2, MSTBY and MBIAS, and by PMOS transistors M3 and M4. The transistors M1 and M2 form a differential pair, the gate of the transistor M1 being coupled to the negative input of the comparator 104, and the gate of the transistor M2 being coupled the positive input of the comparator 104. One of the main current conducting nodes, for example the sources, of each of the transistors M1 and M2 are coupled, or connected, to a common node 202, which is in turn coupled via the biasing transistor MBIAS and the standby transistor MSTBY to the ground rail. The gate of the biasing transistor MBIAS for example receives a biasing voltage V_BIAS, and the gate of the standby transistor MSTBY is for example coupled to the disable line providing the disable signal, which in FIG. 2 is an inverted disable signal $\overline{\text{DISABLE}}$. The other main current conducting node, for example the drain, of the transistor M1 for example supplies the output voltage of the first stage of the comparator 104, and is for example coupled via the transistor M3 to the supply voltage rail Vdd. The other main current conducting node, for example the drain, of the transistor M2 is for example coupled via the transistor M4 to the supply voltage rail Vdd. The gates of the transistors M3 and M4 are for example coupled together, and to the drain of the transistor M4, which is for example a common drain node of the transistors M4 and M2. The auto-zero switch 112 is for example implemented by an NMOS transistor MAZ, coupling, via its main current conducting nodes, the gate and drain of the transistor M1.

The comparator 104 further comprises a second stage 204 comprising a Schmitt trigger 206, which for example generates the output signal WRITE of the comparator 104. The Schmitt trigger 206 introduces hysteresis in order to compensate for slow transitions by the first stage of the comparator, and also provides noise immunity.

The memory 108 is for example implemented by an array, possibly a linear array, of SRAM (static random-access memory) cells. In some embodiments, the memory 108 is a dual port memory, such that simultaneous write and read operations are possible, allowing for example the memories 108 of the pixels of the array to be read while the integration and ADC ramp conversion is underway.

In the embodiment of FIG. 2, the pixel circuit 100 is implemented in three tiers TIER 1, TIER 2 and TIER 3 of a 3-dimensional stack. The tiers TIER 1 and TIER 2 for example form a sensor level (SENSOR LEVEL) and are for example formed by sequential stacking. The tier TIER 3 for example forms a logic level (LOGIC LEVEL) such as an advanced logic level. The tier TIER 1 for example comprises the sensor 102, and the tier TIER 2 for example comprises the first stage of the comparator, and the auto-zero transistor MAZ.

An interconnection 208 between the sense node SN of the sensor 102 and the negative input of the comparator 104 for transmitting the sense node voltage Vpix is for example implemented by a via between the tiers TIER 1 and TIER 2. Similarly, an interconnection 210 between the disable line provided by the logic circuit 110 and the gate of the reset transistor MRST of the sensor 102 is for example implemented by a further via between the tiers TIER 1 and TIER 2.

An interconnection 211 between the output of the first stage of the comparator, and the input of the Schmitt trigger 206, is for example implemented using hybrid bonding contacts between the tiers TIER 2 and TIER 3. Similarly, an interconnection 212 between the disable output of the logic circuit 110 and the gate of the transistor MSTBY and via 210 is for example also implemented using hybrid bonding contacts between the tiers TIER 2 and TIER 3.

Figure 3:
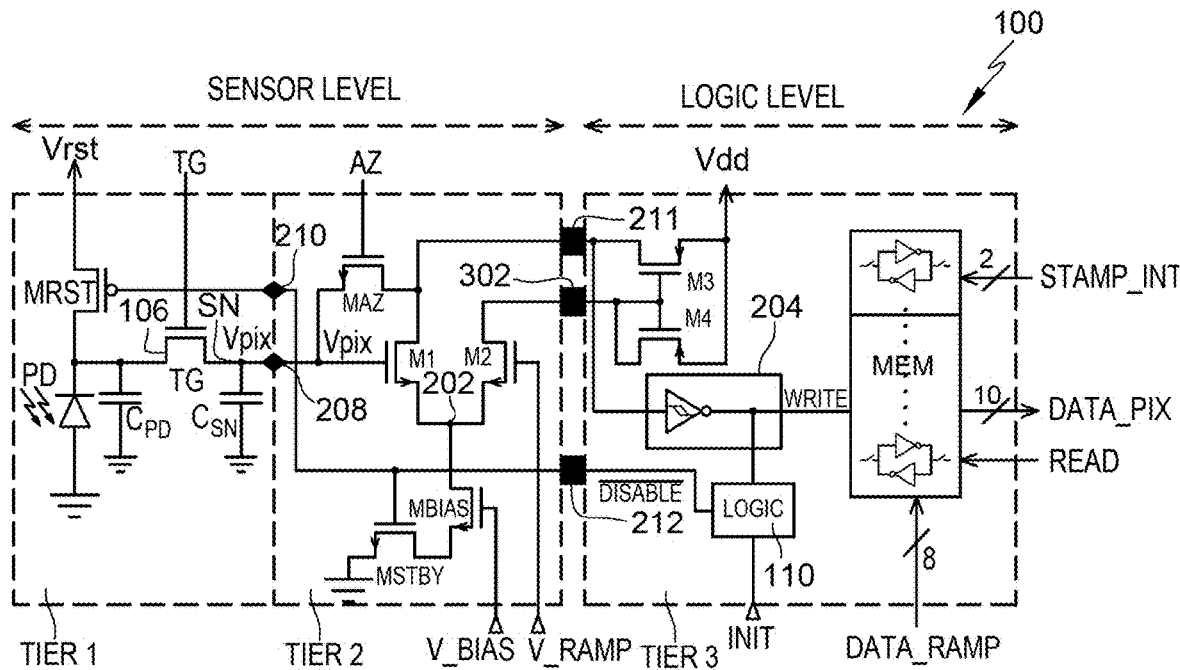
FIG. 3 schematically illustrates the pixel circuit of FIG. 1 in more detail according to another example embodiment of the present disclosure.

FIG. 3 schematically illustrates the pixel circuit 100 of FIG. 1 in more detail according to another example embodiment of the present disclosure. The example of FIG. 3 is similar to that of FIG. 2, except that the transistors M3 and M4 of the first stage of the comparator are moved to the tier TIER 3. Such a solution can be advantageous in the case that space is limited in the tier TIER 2. There is thus an additional interconnection 302 between the tiers TIER 2 and TIER 3 in order to couple the transistors M2 and M4, this interconnection for example being implemented by a hybrid bonding contact.

Figure 4:
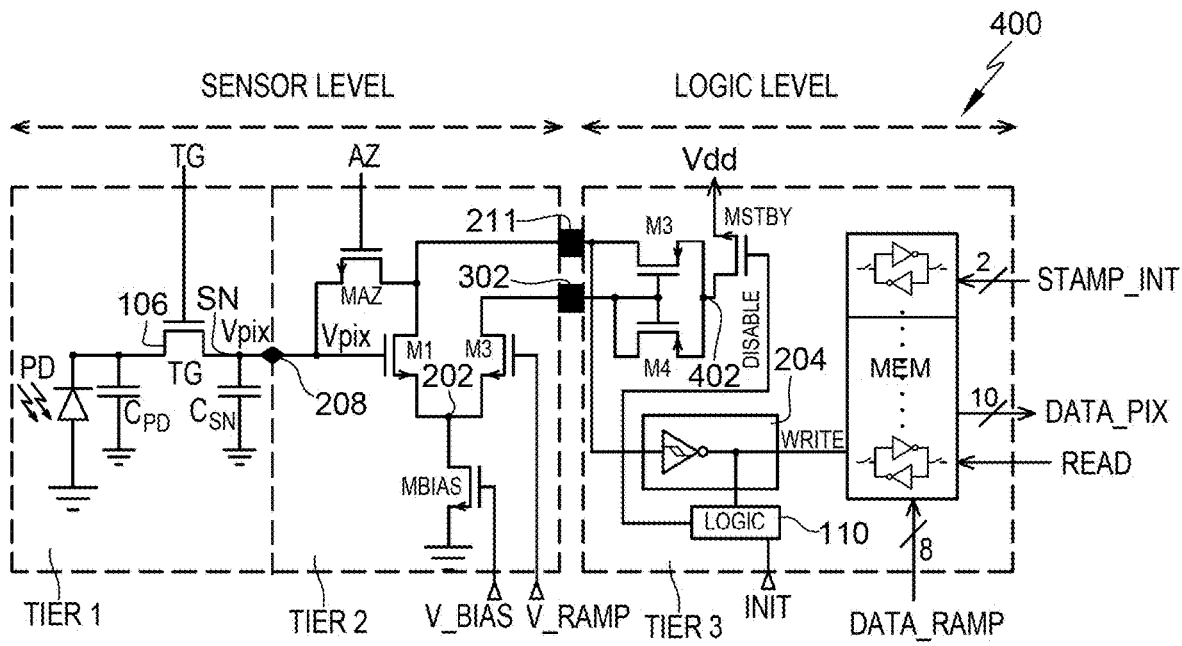
FIG. 4 schematically illustrates a pixel circuit according to another example embodiment of the present disclosure.

FIG. 4 schematically illustrates a pixel circuit 400 according to another example embodiment of the present disclosure. The pixel circuit 400 is similar to the pixel circuit 100 of FIG. 3, except that modifications have been made in order to reduce the interconnections between tiers. Indeed, it may be desirable to limit, in particular, the number of hybrid bonding contacts between the tiers TIER 2 and TIER 3. Therefore, in the embodiment of FIG. 4, the reset transistor MRST of the sensor 102 is no longer present, thereby allowing the interconnection 210 between the tiers TIER 1 and TIER 2 to be removed. Furthermore, the standby transistor MSTBY is removed from the tier TIER 2, and instead placed in the tier TIER 3 between a common node 402 coupled, or connected, to the sources of the transistors M3 and M4, and the Vdd supply rail. The standby transistor MSTBY is also for example implemented as a PMOS rather than NMOS transistor, and the disable signal DISABLE generated by the logic circuit 110 and applied to the gate of the standby transistor MSTBY is thus, in this embodiment, no longer an inverted signal. There are thus only two interconnections 302 and 211 between the tiers TIER 2 and TIER 3.

Figure 5:
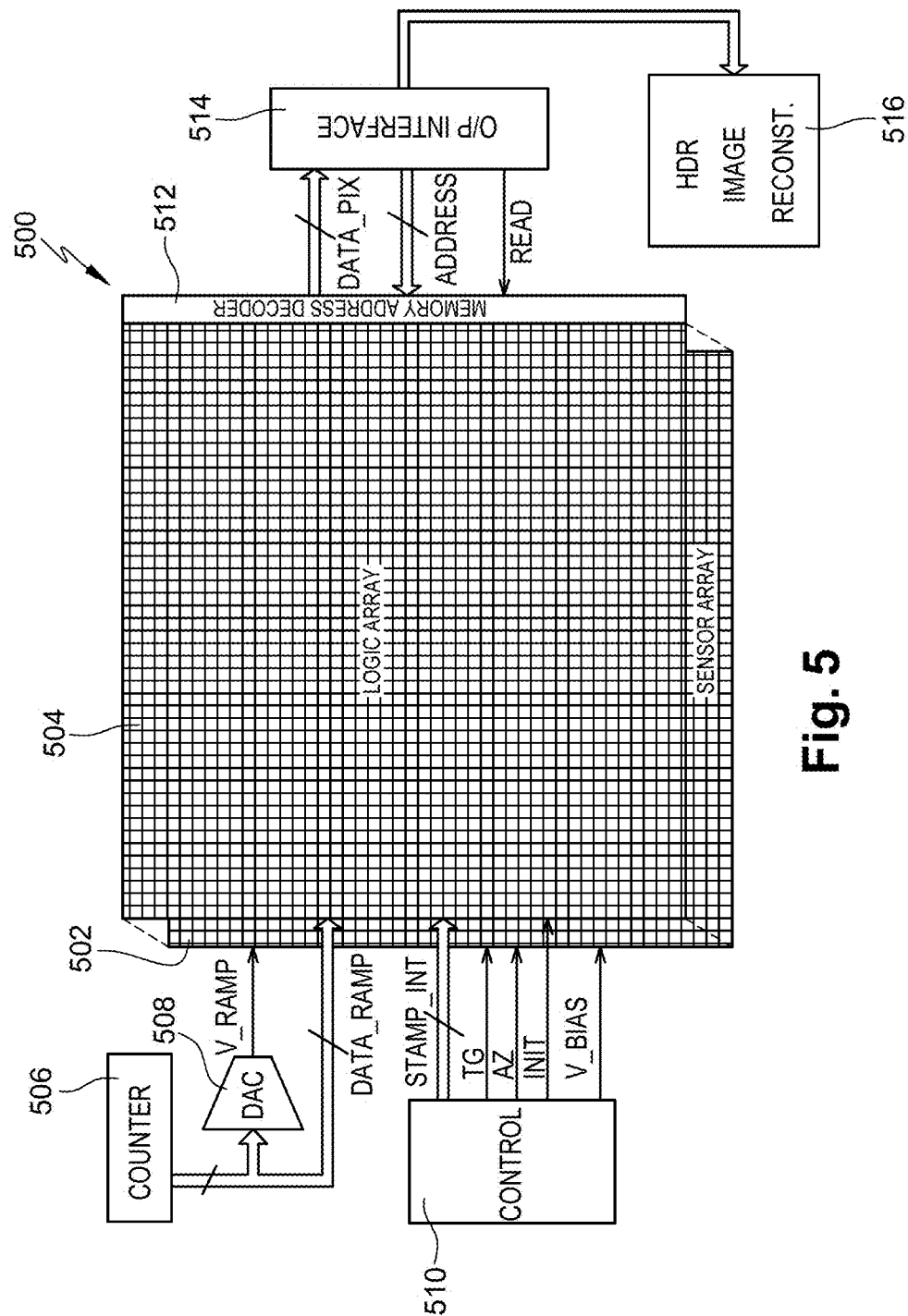
FIG. 5 schematically illustrates an image sensor comprising an array of pixel circuits according to an example embodiment of the present disclosure.

FIG. 5 schematically illustrates an image sensor 500 comprising an array of pixel circuits according to an example embodiment of the present disclosure. The pixel circuits are for example implemented by the pixel circuit 100 of FIG. 1, 2 or 3, or by the pixel circuit 400 of FIG. 4. In particular, the image sensor 500 for example comprises a sensor array (SENSOR ARRAY) 502 comprising, for example, one or more tiers that include the sensors 102 and at least part of the comparators of the pixel circuits, and a logic array (LOGIC ARRAY) 504 stacked on the sensor array 502, and comprising for example the memory 108 and logic circuit 110 of the pixel circuits, and in some cases part of the comparators 104 of pixel circuits.

The image sensor 500 also for example comprises a counter (COUNTER) 506, which is for example an 8-bit, 10-bit or 12-bit counter, configured to generate the digital ramp signal DATA_RAMP, which is provided to the logic array 504, and in particular to the memory 108 of each of the pixel circuits. Furthermore, the image sensor 500 for example comprises a digital to analog converter (DAC) 508 configured to convert the digital ramp signal DATA_RAMP into a voltage signal in order to generate the voltage ramp V_RAMP provided to the sensor array 502, and in particular to the comparator 104 of each of the pixel circuits.

The image sensor 500 also for example comprises a control circuit (CONTROL) 510, implemented for example by a finite state machine, and configured to generate the signals STAMP_INT and INIT, which are provided to the logic array 504, and in particular to the memory 108 and logic circuit 110 respectively of each pixel circuit, and the signals TG, AZ and V_BIAS, which are provided to the sensor array 502, and in particular to the sensor 102, auto-zero switch 112, and comparator 104, of each pixel circuit.

The image sensor 500 also for example comprises a memory address decoder (MEMORY ADDRESS DECODER) 512 coupled to the logic array 504, and an output interface (O/P INTERFACE) 514 coupled to the memory address decoder 512. The output interface 514 is for example configured to read images captured by the sensor array by supplying the read signal READ and an address signal ADDRESS to the memory address decoder 512. There is for example a pixel data bus from the memory 108 of each pixel circuit to the memory address decoder 512, and the address signal ADDRESS for example designates a single pixel circuit that is to be read. The memory address decoder 512 is for example configured to supply the read signal READ to memory 108 of the pixel circuit designated by the address, and the memory 108 of the pixel circuit responds by outputting the corresponding pixel data signal DATA_PIX from its memory.

The image sensor 500, or an external circuit (not illustrated), for example further comprises an image reconstruction device (HDR IMAGE RECONST.) 516, which is for example configured to reconstruct a high dynamic range image based on pixel readings from the array, as will be described in more detail below. For example, the device 516 is implemented by a processing device, such as a CPU (central processing unit) or ISP (image signal processor).

Figure 6:
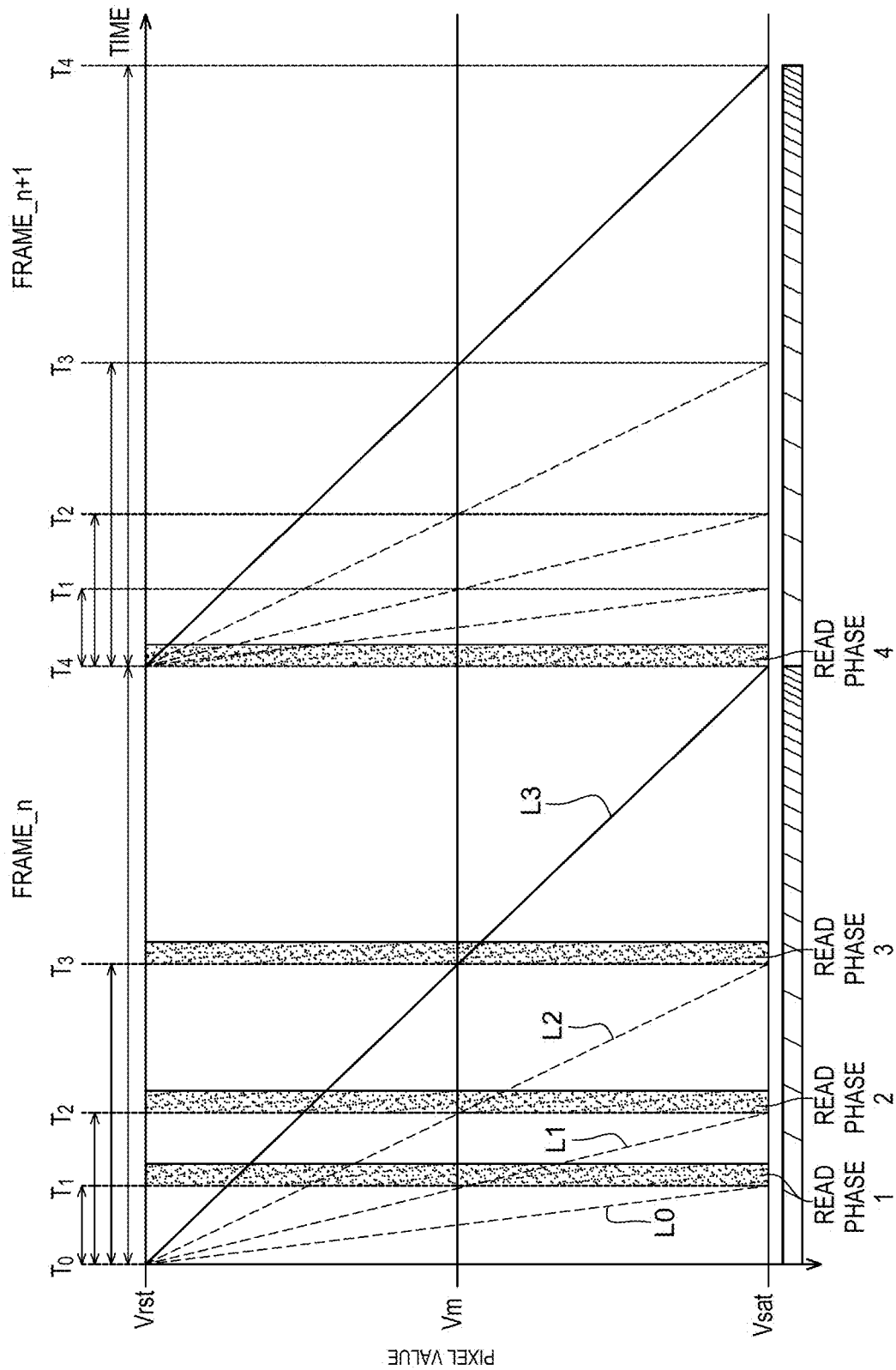
FIG. 6 is a timing diagram representing read phases of the image sensor of FIG. 5 according to an example embodiment of the present disclosure.

FIG. 6 is a timing diagram representing read phases of the image sensor 500 of FIG. 5 according to an example embodiment of the present disclosure. The example of FIG. 6 is based on four read phases, but in alterative embodiments there could be at least two read phases, and for example up to 6, 8, 12, 16 or 32 read phases. FIG. 6 represents time (TIME) along the x axis, and the pixel value (PIXEL VALUE) along the y-axis, where the pixel value corresponds for example to the pixel voltage Vpix. This pixel voltage is for example in a range from a low voltage level Vsat, for example at or close to the ground voltage (0 V) corresponding to the lowest voltage to which the sense node SN can fall when illumination is at a maximum, and a high voltage level corresponding to the reset voltage Vrst.

An integration period for an nth frame (FRAME_n) starts at a time $T_0$.

A first read phase starts at a time $T_1$ after the TG command is pulsed, this TG pulse for example being a global command for all pixels in the array. All photogenerated carriers during the period $T_0$ to $T_1$ are simultaneously transferred and stored at the corresponding Vpix nodes. The first read phase involves a voltage ramp V_RAMP having a range Vsat to Vm, where Vm is for example the mid-point voltage between the voltages Vsat and Vrst. In the case that the charge transfer is subtractive like in the example of FIG. 6, and assuming that Vsat is the ground voltage, the voltage Vm is for example chosen as Vrst/2. Inversely, in the case (not illustrated) that the charge transfer is additive, the voltages Vrst and Vsat are inverted, and if the voltage Vrst is at the ground voltage, the voltage Vm is for example chosen as Vsat/2.

A line L0 in FIG. 6 represents a pixel having a sense node voltage Vpix falling from Vrst at the time $T_0$ to Vsat at the time $T_1$, which corresponds to a maximum amount of illumination without exceeding the saturation limit. The integration time $T_1$ is for example chosen such that no pixel will saturate before the time $T_1$ is reached. During the first read phase, any pixels having sense node voltages between the voltages Vsat and Vm will trigger the corresponding comparator and thus the value will be converted and stored to the memory 108. These pixels correspond to those having sense node voltages Vpix between lines L0 and L1 in FIG. 6, where L1 represents a pixel having a sense node voltage Vpix falling from Vrst at the time $T_0$ to Vm at the time $T_1$. These pixels have been read, and therefore they are for example disabled for the remainder of the read cycle of the array, in other words until the start of the next frame capture. All other pixels for example keep the stored value Vpix, which for these pixels is between the voltages Vm and Vrst. During the first read phase, the stamp signal STAMP_INT for example has a first binary value, equal for example to binary "11".

A second read phase starts at a time $T_2$ after the TG command is pulsed again, this TG pulse for example being a global command for all pixels in the array. In the unread pixels, in other words the pixels that were not read during the first read phase, the voltage Vpix stored at the first read phase is accumulated with the new carriers photogenerated between the period $T_1$ to $T_2$. The second read phase for example involves the same voltage ramp Vsat to Vm as applied during the first read phase. The integration time $T_2$ is for example chosen to correspond to twice $T_1$, which is a time at which pixels having a sense node voltage just above Vm at the time $T_1$ have a sense node voltage Vpix falling to Vsat at the time $T_2$, as represented by the line L1. During the second read phase, any pixels having sense node voltages Vpix between the voltages Vsat and Vm will trigger their corresponding comparator and thus be read and disabled, as for pixels read during the first read phase. These pixels correspond to those having sense node voltages Vpix between lines L1 and L2 in FIG. 6, where L2 represents a pixel having a sense node voltage Vpix falling to Vm at the time $T_2$. All other pixels for example keep the stored value Vpix, which for these pixels is between the voltages Vm and Vrst. During the second read phase, the stamp signal STAMP_INT for example has a second binary value different to the first, and equal for example to binary "10".

A third read phase starts at a time $T_3$, after the TG command is pulsed again, this TG pulse for example being a global command for all pixels in the array. In the unread pixels, in other words the pixels that were not read during the first and second read phases, the voltage Vpix is accumulated with the new carriers photogenerated between the period $T_2$ to $T_3$. The third read phase for example involves the same voltage ramp Vsat to Vm as applied during the first read phase. The integration time $T_3$ is for example chosen to correspond to twice $T_2$, which is a time at which pixels having a sense node voltage Vpix just above Vm at the time $T_2$ have a sense node voltage Vpix falling to Vsat at the time $T_3$, as represented by the line L2. During the third read phase, any pixels having sense node voltages between the voltages Vsat and Vm will trigger the corresponding comparator and thus be read and disabled, as for pixels read during the first and second read phases. These pixels correspond to those having sense node voltages between lines L2 and L3 in FIG. 6, where L3 represents a pixel having a sense node voltage Vpix falling to Vm at the time $T_3$. All other pixels for example keep the stored value Vpix, which for these pixels is between the voltages Vm and Vrst. During the third read phase, the stamp signal STAMP_INT for example has a third binary value, different to the first and second values, and equal for example to binary "01".

A fourth read phase starts at a time $T_4$, after the TG command is pulsed again, this TG pulse for example being a global command for all pixels in the array. In the unread pixels, in other words the pixels that were not read during the first, second and third read phases, the voltage Vpix is accumulated with the new carriers photogenerated between the period $T_3$ to $T_4$. The fourth read phase for example involves a full amplitude ramp from Vsat to Vrst, which is applied in order to read any pixels not already read during the first, second and third read phases. The integration time $T_4$ is for example chosen to correspond to twice $T_3$, which is a time at which pixels having a sense node voltage just above Vm at the time $T_3$ have a sense node voltage Vpix falling to Vsat at the time $T_4$, as represented by the line L3. During the fourth read phase, the stamp signal STAMP_INT for example has a fourth binary value, different to the first, second and third values, and equal for example to binary "00".

An integration period for an (n+1)th frame (FRAME_n+1) for example starts at the time $T_4$.

Figure 7:
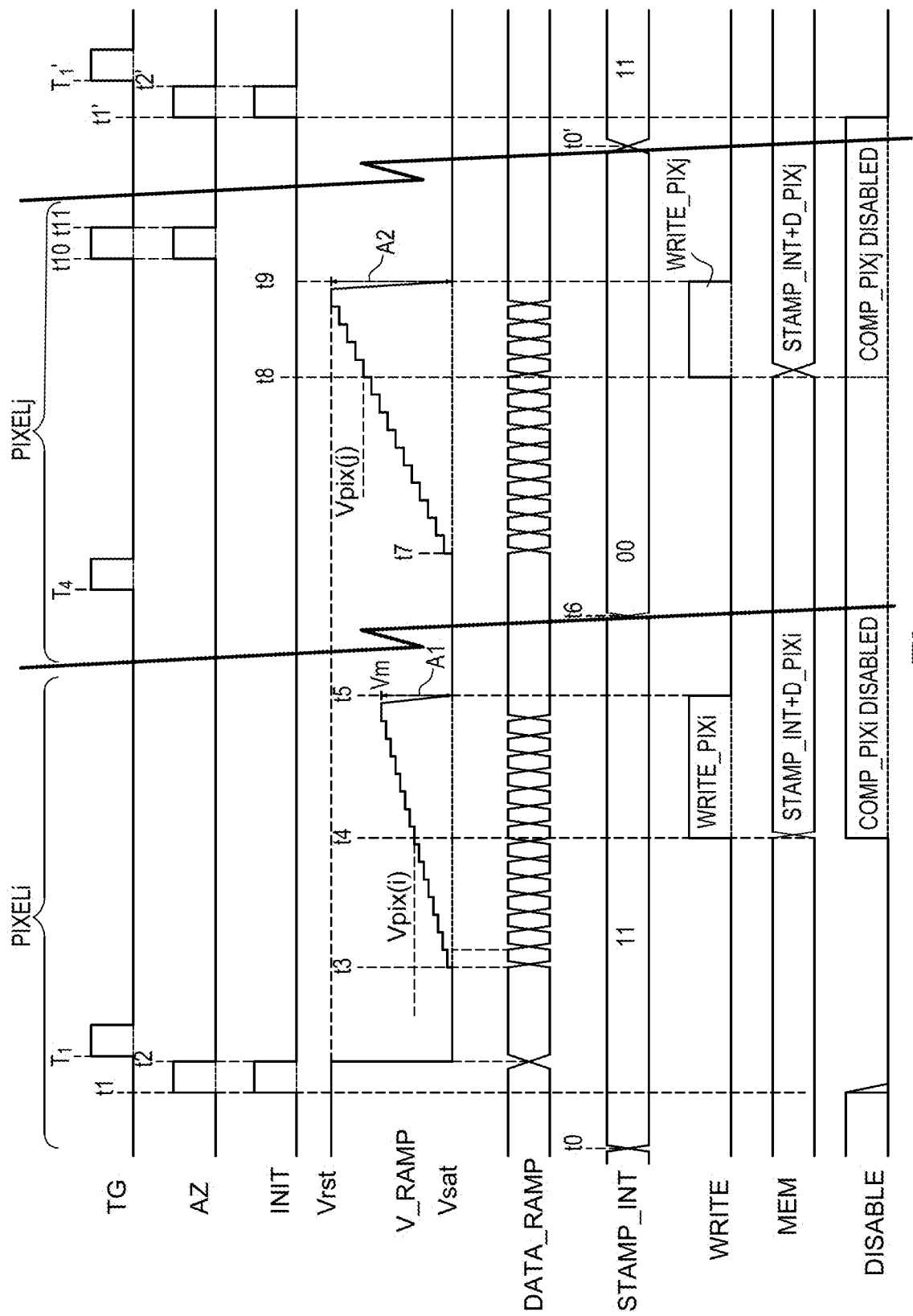
FIG. 7 is another timing diagram representing read phases of the image sensor of FIG. 5 according to an example embodiment of the present disclosure.

FIG. 7 is another timing diagram representing an integration period and read phases of the image sensor of FIG. 5 according to an example embodiment of the present disclosure. FIG. 7 illustrates in particular the signal TG, AZ, INIT, V_RAMP, DATA_RAMP, STAMP_INT, WRITE, MEM and DISABLE, and a value MEM stored in the memory 108, for a pixel i (PIXEL i) and a pixel j (PIXEL j).

In the example of FIG. 7, the illumination of pixel i causes it to be read during the first read phase at time $T_1$, and the illumination of pixel j causes it to be read during the fourth read phase at time $T_4$.

Initially, prior to the start of the integration period, the signal DISABLE is for example active for all pixels of the array, the signals TG, AZ, INIT and WRITE are low, and the signal DATA_RAMP is for example at a level corresponding to Vrst, such that the voltage V_RAMP is at the voltage Vrst, or at approximately the voltage Vrst.

At a time t0, the signal STAMP_INT is for example updated to have the value corresponding to the first read phase, equal to binary "11" in this example. This update for example occurs at any time before the start of the first read phase.

At a time t1, the signals AZ and INIT are brought high, causing the logic circuit 110 to deactivate the disable signal DISABLE, and causing the sense node voltage Vpix to be brought to the level of the ramp signal V_RAMP, which is for example the voltage level Vrst.

At a time t2, for example after t1, the signals AZ and INIT fall low, and the digital ramp signal DATA_RAMP for example changes to a level corresponding to the voltage Vsat, such that the voltage ramp V_RAMP also goes to this voltage Vsat.

The start time $T_1$ of the first read phase is for example shortly after the time t2, and comprises a rising edge of a positive pulse of the signal TG.

At a time t3 after the time $T_1$, the digital data ramp signal DATA_RAMP starts to increment in binary steps, causing the voltage ramp V_RAMP to rise in steps from Vsat towards the voltage Vm. This ramp for example has an amplitude A1 reduced with respect to a full ramp amplitude.

At a time t4 after the time t3, the voltage level of the voltage ramp V_RAMP crosses the voltage Vpix (i) at the sense node SN of the pixel i. In this example, in view of the rising voltage ramp, the voltage ramp V_RAMP rises above Vpix (i) at the time t4, but in the case of a falling ramp, it would also be possible for the voltage ramp V_RAMP to fall below Vpix (i) at the time t4. This crossing of the voltage Vpix (i) by the voltage ramp V_RAMP causes the write signal WRITE_PIXi associated with pixel i to be asserted, and the memory 108 of the pixel i to store the digital values STAMP_INT+D_PIXi that the stamp signal STAMP_INT and the digital ramp signal DATA_RAMP have at the time t4. Furthermore, the disable signal DISABLE of the pixel i is asserted by the logic circuit 110 such that the comparator of the pixel i is disabled (COMP PIX i DISABLED), and in the case of the pixel circuit 100, a reset operation is also applied to the photodiode of the pixel i.

At a time t5 after the time t4, the digital ramp signal DATA_RAMP for example reaches a value corresponding to the voltage level Vm, and thus the voltage ramp V_RAMP also reaches the voltage level Vm, and then falls back to Vsat, causing the write signal WRITE_PIXi of pixel i to fall low, thereby completing the read operation of pixel i to its memory 108.

The reading of pixel j during the fourth read phase for example occurs in a similar manner to the first read phase, except that a full range voltage ramp is applied.

The start time $T_4$ of the fourth read phase comprises a rising edge of a positive pulse of the signal TG.

At a time t7 after the time $T_4$, the digital data ramp signal DATA_RAMP starts to increment in binary steps, causing the voltage ramp V_RAMP to rise in steps from Vsat towards the voltage Vrst. This ramp for example has an amplitude A2 corresponding to the full range from the voltage level Vsat to the voltage level Vrst.

At a time t8 after the time t7, the voltage level of the voltage ramp V_RAMP crosses the voltage Vpix (j) at the sense node SN of the pixel j. This causes the write signal WRITE_PIXj associated with pixel j to be asserted, and the memory 108 of the pixel j to store the digital values STAMP_INT+D_PIXj that the stamp signal STAMP_INT and the digital ramp signal DATA_RAMP have at the time t8. Furthermore, the disable signal DISABLE of the pixel j is asserted by the logic circuit 110 such that the comparator of the pixel j is disabled (COMP PIX j DISABLED), and in the case of the pixel circuit 100, a reset operation is also applied to the photodiode of the pixel j.

At a time t9 after the time t8, the digital ramp signal DATA_RAMP for example reaches a value corresponding to the voltage level Vrst, and thus the voltage ramp V_RAMP also reaches the voltage level Vrst, and then falls back to Vsat, causing the write signal WRITE_PIXj of pixel j to fall low, thereby completing the read operation of pixel j to its memory 108.

As the fourth read phase is for example the final read phase of the frame, a pixel reset is then for example applied by asserting, at a time t10, the signals TG and AZ, and then bringing these signals low again at a time t11. Integration and read phases of a next frame then for example start, correspond to time $T_0$ of FIG. 6.

When an image is to be output by the image sensor 500, the memory 108 of each of the pixel circuits is for example read, and the digital values are for example reconstructed by the image reconstruction device 516 of FIG. 5, to generate a high dynamic range image. This reconstruction comprises for example converting each digital value read from the memory 108 of each pixel circuit into an image pixel value using an appropriate conversion based on the duration of the integration time. The following table (Table 1) provides an example conversion based on the example of the read phases of FIGS. 6 and 7:

TABLE 1

| T | DURATION | ILLUM RANGE MIN | ILLUM RANGE MAX | MSB | ADC BINARY MIN | ADC BINARY MAX | DIG VALUE MIN | DIG VALUE MAX |
|---|---|---|---|---|---|---|---|---|
| T1 | T1 | 1024 | 2047 | 11 | 00000000 | 11111111 | 768 | 1023 |
| T2 | 2 × T1 | 512 | 1023 | 10 | 00000000 | 11111111 | 512 | 767 |
| T3 | 4 × T1 | 256 | 511 | 01 | 00000000 | 11111111 | 256 | 511 |
| T4 | 8 × T1 | 1 | 255 | 00 | 00000000 | 11111111 | 1 | 255 |

In this table: T indicates the integration times $T_1$ ($T_1$), $T_2$ ($T_2$), $T_3$ ($T_3$) and $T_4$ ($T_4$); the duration (DURATION) of each integration time is expressed as a multiple of the smallest integration time $T_1$; the illumination minimum (MIN) to maximum (MAX) range (ILLUM RANGE) indicates, in arbitrary units, the relative illumination range for the image sensor pixels at each period T1 to T4; the most significant two bits (MSB) of the illumination value, corresponding to the stamp value STAMP_INT, is indicated; the minimum to maximum range of the digital binary value (ADC BINARY) resulting from the ramp conversion is indicated; and the minimum to maximum range of the corresponding digital image pixel value is indicated (DIG VALUE).

As shown in Table 1, analog to digital conversion is for example arbitrarily set such that, whatever the amplitude of the ramp, each full-scale maximum signal value corresponds to the maximum binary value, and the minimum signal value corresponds to the zero binary value.

Figure 8:
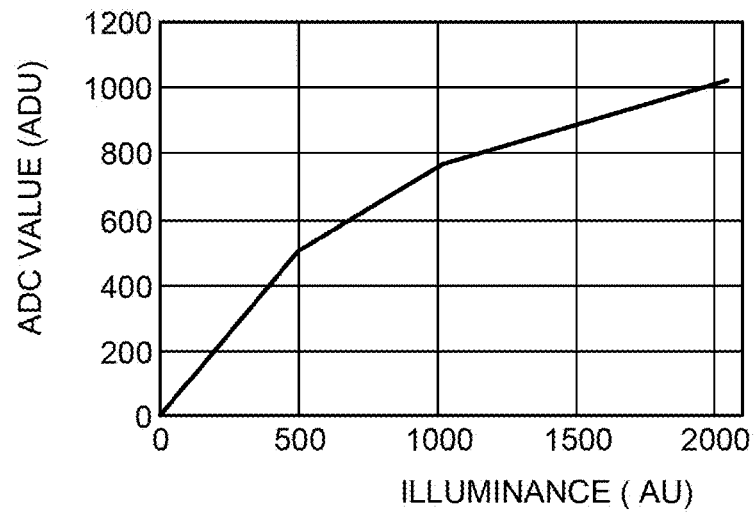
FIG. 8 is a graph representing digital pixel values captured by pixels of the image sensor of FIG. 5 as a function of luminance according to an example embodiment of the present disclosure.

FIG. 8 is a graph representing digital pixel values (ADC VALUE (ADU)), similar to the values DIG VALUE of Table 1, in arbitrary digital units, captured by pixels of the image sensor 500 of FIG. 5 as a function of luminance (ILLUMINANCE (AU)) in arbitrary units (AU), similar to the values ILLUM RANGE of Table 1, according to an example embodiment of the present disclosure, and constructed based on Table 1 above. This graph represents in particular the compression operation, in particular the representation of a dynamic of 2047 (around 67 dB), which is eight times that achieved using a single integration method. Indeed, the longest integration period $T_4$ is eight times longer than the shortest integration period $T_1$.

Of course, while FIGS. 6 and 7 are based on four read phases, a different number of read phases could be used. An example based on eight read phases will now be described with reference to FIG. 9.

Figure 9:
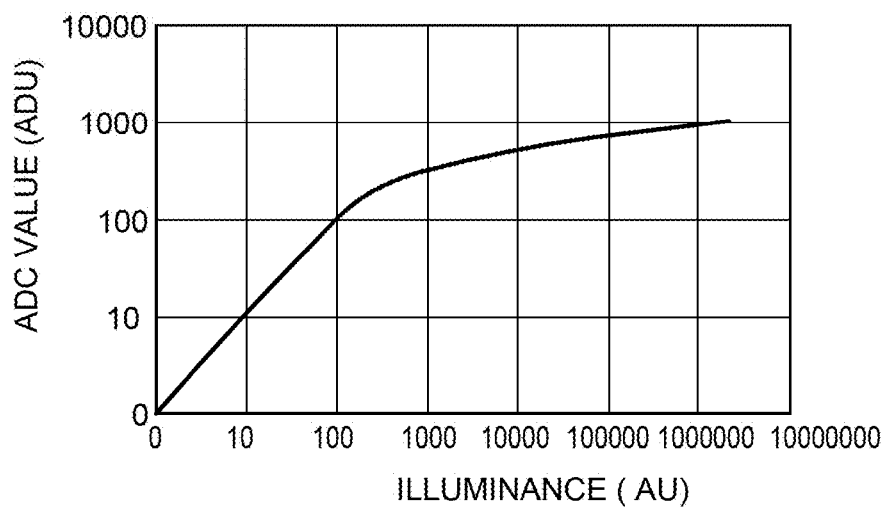
FIG. 9 is a graph representing digital pixel values captured by pixels of the image sensor of FIG. 5 as a function of luminance according to another example embodiment of the present disclosure.

FIG. 9 is a graph representing digital pixel values captured by pixels of the image sensor of FIG. 5 as a function of luminance according to another example embodiment of the present disclosure.

The graph of FIG. 9 is based on a conversion as represented in Table 2 below, which has a similar presentation to Table 1, but includes eight integration periods T1 to T8, with a factor of four between the duration of one integration period and the next. In particular, the period T1 has a nominal duration, the period T2 a duration of four times T1, the period T3 a duration of four times T2, and thus 16 times T1, etc.

TABLE 2

| T | DURATION | ILLUM RANGE MIN | ILLUM RANGE MAX | MSB | ADC BINARY MIN | ADC BINARY MAX | DIG VALUE MIN | DIG VALUE MAX |
|---|---|---|---|---|---|---|---|---|
| T1 | T1 | 524288 | 2097151 | 111 | 0 | 1111111 | 896 | 1023 |
| T2 | 4 × T1 | 131072 | 524287 | 110 | 0 | 1111111 | 768 | 895 |
| T3 | 16 × T1 | 32768 | 131071 | 101 | 0 | 1111111 | 640 | 767 |
| T4 | 64 × T1 | 8192 | 32767 | 100 | 0 | 1111111 | 512 | 639 |
| T5 | 256 × T1 | 2048 | 8191 | 11 | 0 | 1111111 | 384 | 511 |
| T6 | 1024 × T1 | 512 | 2047 | 10 | 0 | 1111111 | 256 | 383 |
| T7 | 4096 × T1 | 128 | 511 | 1 | 0 | 1111111 | 128 | 255 |
| T8 | 16384 × T1 | 0 | 127 | 0 | 0 | 1111111 | 0 | 127 |

In this example, the digital value STAMP_INT is a 3-bit value, the conversion length is only 7 bits, and the equivalent dynamic range would reach 127 dB as illustrated in the log-log response of FIG. 9. The dynamic range improvement in this example has a factor of 16384.

Figure 10:
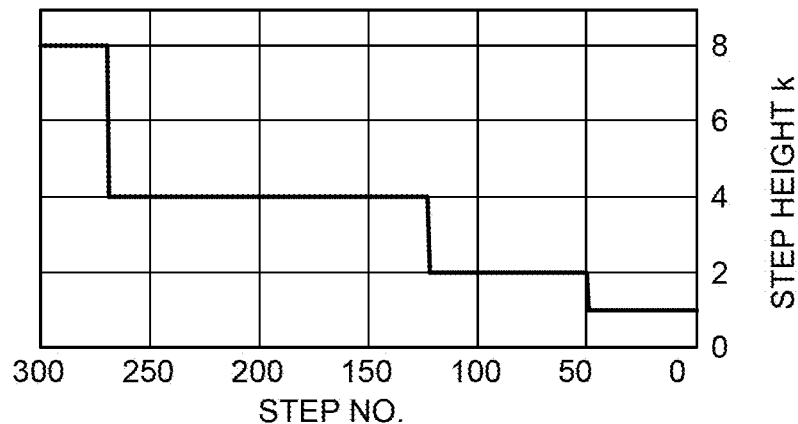
FIG. 10 is a graph representing a variable step height of a ramp signal according to an example embodiment of the present disclosure.

FIG. 10 is a graph representing a variable step-height of a ramp signal according to an example embodiment of the present disclosure. FIG. 10 represents in particular the step height k (STEP HEIGHT k) as a function of the step number (STEP NO.). Such a variation in the step height provides a conversion speed enhancement, by shortening the ramp time. This is based on the fact that high illumination levels contain a high component of shot noise, and thus there is no gain in converting the entire dynamic range with a fine resolution.

For example, considering a full well capacity of the sense node of a pixel circuit of 6000e-, the corresponding shot noise is $\sqrt{6000}$=77.5e-. In a 10-bit conversion scale, this is equivalent to 13.2 ADU. This implies that at least 3 bits of the converted signal represent noise. At half the dynamic range, i.e. at 3000e-, shot noise is 9.3 ADU.

Improved ramp stepping is for example described in the publications Snoeji M F, et al. "A low power column parallel 12-bit ADC for CMOS imagers", in IEEE workshop on CCDs & AIS, 2005, p169-172, and Snoeji M F, et al. "Multiple-ramp column-parallel ADC architectures for CMOS image sensors" in IEEE journal of solid-state image circuits, vol. 42, no. 12, pp. 2968-2977. Based on the following equation cited in the latter publication:

$$N_{sig} = \left(\frac{N_{sat} \cdot k}{2^n \cdot \sqrt{12} \cdot r}\right)^2 \qquad \text{[Math. 1]}$$

with $N_{sat}$=6000e-, n=10 bits, r=0.1 and k=(1,2,4,8), only steps ×2 and ×4 are useful for converting cycles at half dynamic. Calculations indicate that less than 200 steps are sufficient for a compatible 10-bit resolution for the three first cycles. The same configuration can be used for the last conversion, where full scale is scanned.

Calculations result in a total 301 variable steps distributed as shown in FIG. 10. In particular, in this example, conversion starts with 31 steps at eight times the nominal step height, followed by 147 steps at four times the nominal step height, 74 steps at twice the nominal step height, and then 49 steps at the nominal step height, leading to a total of 301 steps rather than 1024 steps. Such an implementation is for example made using a variable step DAC driven by a programmed counter.

Second Aspect—Pixel Circuit with Event-Driven Readout

While the embodiments described with reference to FIGS. 1 to 10 above are based on the use of a memory 108 implemented in each pixel circuit of an image sensor, in some embodiments there is not sufficient available space for such a memory. Furthermore, the power consumption of the parallel data bus used to transmit the digital ramp signal DATA_RAMP to all pixels of the array in parallel can be too high for some applications, in view of the relatively high capacitances to be driven at every data bus node. An event-driven solution will now be described with reference to FIGS. 11 to 20 that provides an alternative approach without the memory 108 and digital ramp signal DATA_RAMP.

Figure 11:
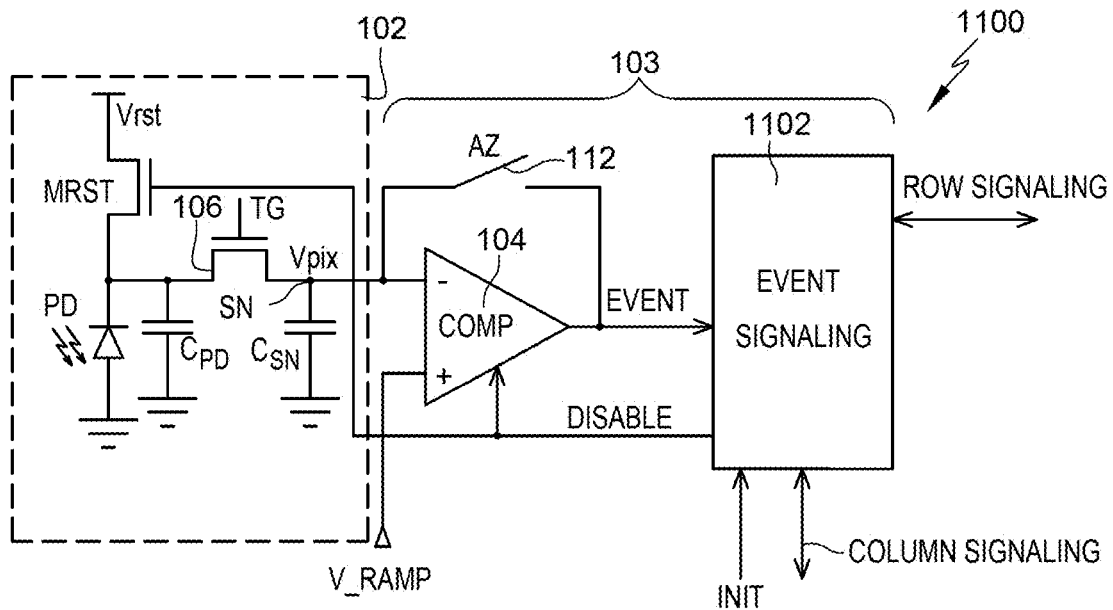
FIG. 11 schematically illustrates a pixel circuit according to another example embodiment of the present disclosure.

FIG. 11 schematically illustrates a pixel circuit 1100 based on event-driven readout according to example embodiment of the present disclosure. The pixel 1100 is similar to the pixel 100 of FIG. 1, and like features are labelled with like reference numerals and will not be described again in detail. In particular, the sensor 102, comparator 104 and auto-zero switch 112 are the same as in the pixel 100. However, the logic circuit 110 and memory 108 of the pixel circuit 100 are replaced in the pixel circuit 1100 by an event signaling (EVENT SIGNALING) circuit 1102, and the output signal of the comparator 104 is no longer a write signal, but an event signal EVENT indicating that an event should be communicated to peripheral event logging circuitry (described in more detail below). Indeed, the event signaling circuit 1102 for example implements a handshake protocol over one or more row lines (ROW SIGNALING) that are used for row line signaling and over one or more column lines (COLUMN SIGNALING) that are used for column line signaling.

The event signaling circuit 1102 also for example receives the initialization signal INIT, and, in response to this command, is configured, for example, to restore the functionalities of the comparator 104 and/or the photodiode PD by setting a disable signal DISABLE to a non-asserted state. The disable signal DISABLE is for example supplied to an enable input of the comparator 104 and/or is used for activating the reset transistor MRST, if present.

Figure 12:
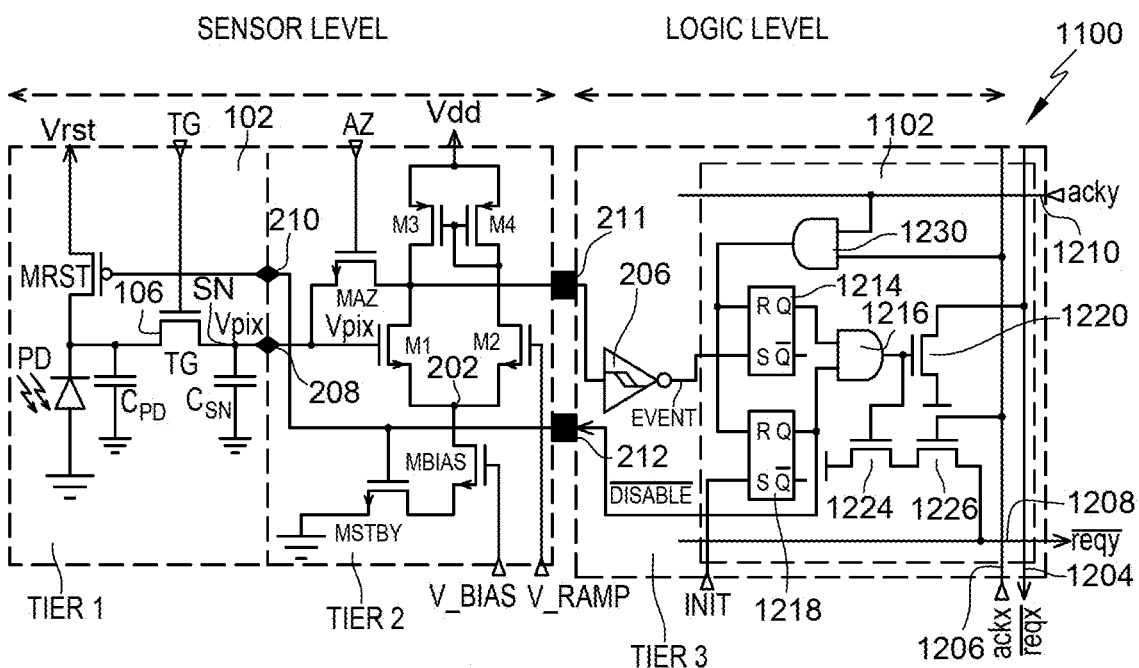
FIG. 12 schematically illustrates the pixel circuit of FIG. 11 in more detail according to an example embodiment of the present disclosure.

FIG. 12 schematically illustrates the pixel circuit 1100 of FIG. 11 in more detail according to an example embodiment of the present disclosure, based on three tiers TIER 1, TIER 2 and TIER 3. The pixel circuit of FIG. 12 is similar to the pixel circuit of FIG. 2, and the tiers TIER 1 and TIER 2 of FIG. 12 comprise the same elements as those of FIG. 2. The tier TIER 3 of FIG. 12 is, however, different from the one of FIG. 2, the output of the Schmitt trigger 206 generating the event signal EVENT, and being coupled to the event signaling circuit 1102.

An example implementation of the event signaling circuit 1102 is illustrated in FIG. 12. For example, the event signaling circuit 1102 is similar to the one described in US patent application published as US2021/0337150 in the name of the present applicant.

The one or more column and row signaling lines respectively comprise, in the embodiment of FIG. 12, shared column lines 1204 and 1206, and shared row lines 1208 and 1210. The shared column lines 1204, 1206 are for example coupled to at least two, and generally to all, of the pixels of a column of the pixel array of the image sensor, and shared row lines 1208, 1210 are for example coupled to at least two, and generally to all, of the pixels of a row of the pixel array of the image sensor.

The shared column line 1204 is for example a column readout request line over which the event signaling circuit 1102 indicates when it detects an event by asserting a column request signal $\overline{reqx}$. The shared column line 1206 is for example an acknowledgement line over which the event signaling circuit 1102 receives a column acknowledgement signal ackx indicating that the request has been registered by a corresponding column event detection circuit (described in more detail below).

The shared row line 1208 is for example a row readout request line over which the event signaling circuit 1102 indicates when it has detected an event, and has received an acknowledgement ackx on the column acknowledge line 1206, by asserting a request signal $\overline{reqy}$. The shared row line 1210 is for example an acknowledgement line over which the event signaling circuit 1102 receives a row acknowledgement signal acky indicating that the request has been registered by a corresponding row event detection circuit (described in more detail below).

The event signaling circuit 1102 is for example configured to assert, in response to the activation of the event signal EVENT by the comparator, the request signal $\overline{reqx}$ on the line 1204. The event signaling circuit 1102 is then for example configured to detect when the acknowledgement signal ackx is asserted on the line 1206, and to assert, in response, the request signal $\overline{reqy}$ on the line 1208. The event signaling circuit 1102 is then for example configured to detect when the acknowledgement signal acky is asserted on the line 1210, and to assert, in response, the disable signal, which in the example of FIG. 12 is a signal $\overline{DISABLE}$ that is active low.

The output of the comparator, corresponding for example to the output of the Schmitt trigger 206, is for example coupled to an input of a flip-flop 1214. The flip-flop 1214 is configured to store an event-detection state at its output Q until the event has been registered by the column and row event detection circuits. In some embodiments, the flip-flop 1214 is implemented by an RS (reset-set) flip-flop, wherein the set input S of the flip-flop 1214 receives the output of the Schmitt trigger 206. However, other implementations based on any bi-stable device would be possible.

In some embodiments, the output of the flip-flop 1214 is coupled to one input of an AND gate 1216, the other input of which is coupled to the output of a further flip-flop 1218. The further flip-flop 1218 for example receives, at an input, the signal INIT, indicating when the pixel circuit 1200 is to become active. In some embodiments, the flip-flop 1218 is implemented by an RS flip-flop 1218 receiving the signal INIT at its set input S.

The output of the AND gate 1216 for example activates a switch 1220 that is configured to assert the request signal $\overline{reqx}$. In some embodiments, the request signal $\overline{reqx}$ is active low, and the switch 1220 is implemented by a transistor, such as an NMOS transistor, having its gate coupled to the output of the AND gate 1216, and coupling, via its main conducting nodes, the line 1204 to ground. Of course, it would be equally possible for the line 1204 to be active high, by replacing NMOS transistors by PMOS transistors, and inverting their respective digital input command.

The output of the AND gate 1216 also for example causes the request signal $\overline{\text{reqy}}$ to be asserted on the line 1208 when the acknowledgement signal ackx on the line 1206 is asserted. For example, the request signal $\overline{\text{reqy}}$ is asserted when two switches 1224, 1226 are activated, the switch 1224 being activated by the output of the AND gate 1216, and the switch 1226 being activated by the acknowledgement signal ackx. In some embodiments, the request signal $\overline{\text{reqy}}$ is active low, and the switches 1224, 1226 are coupled in series with each other between the line 1208 and ground. For example, the switches 1224, 1226 are implemented by transistors, such as NMOS transistors, coupled in series via their main conducting nodes, the switch 1224 having its gate coupled to the output of the AND gate 1216, and the switch 1226 having its gate coupled to the line 1206. Of course, it would be equally possible for the line 1208 to be active high, by replacing NMOS transistors by PMOS transistors, and inverting their respective digital input command.

The reinitialization of the event signaling circuit 1102 is for example performed by an AND gate 1230, which for example has one of its inputs coupled to the acknowledgement line 1206, the other of its inputs coupled to the acknowledgement line 1210, and its output coupled to the flip-flops 1214, 1218 in order to reset their states. In the case that the flip-flops 1214, 1218 are RS flip-flips, the output of the AND gate 1230 is for example coupled to the reset input R of these flip-flops.

Figure 13:
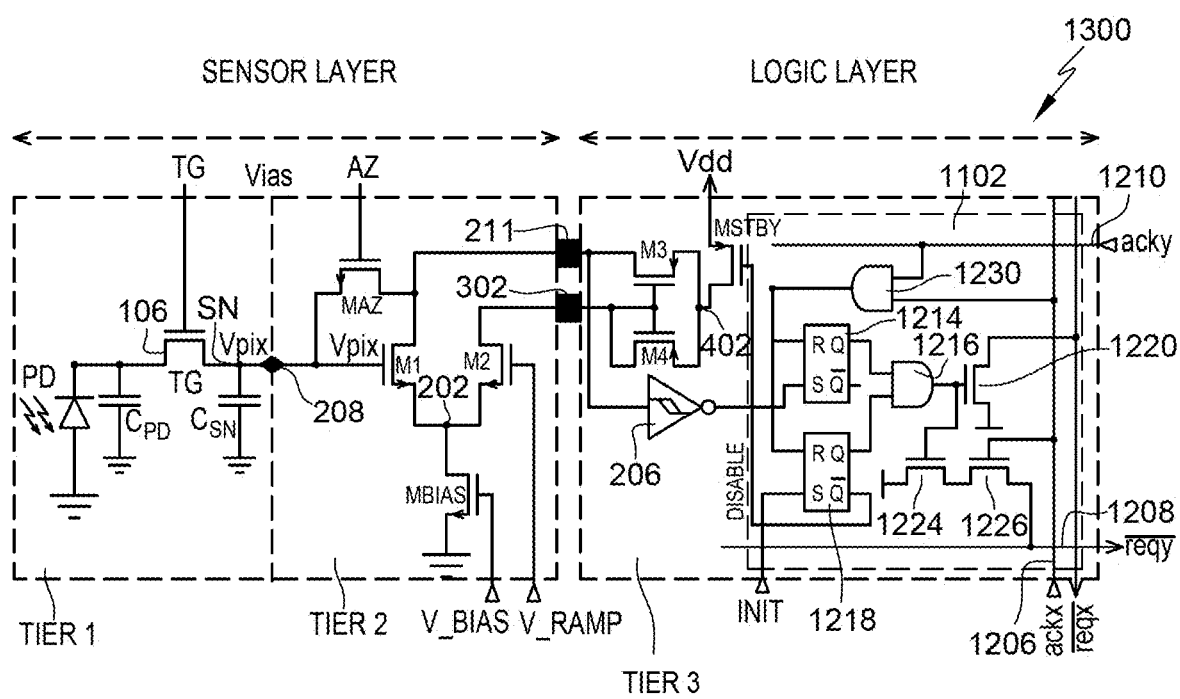
FIG. 13 schematically illustrates a pixel circuit according to yet another example embodiment of the present disclosure.

FIG. 13 schematically illustrates a pixel circuit 1300 according to yet another example embodiment of the present disclosure. The pixel circuit 1300 is similar to the pixel circuit 1200, but with the same modifications as those applied in the pixel circuit 400 of FIG. 4 with respect to the pixel circuit 200 of FIG. 2. The pixel circuit 1200 could equally be implemented according to the intermediate solution of FIG. 3.

Figure 14:
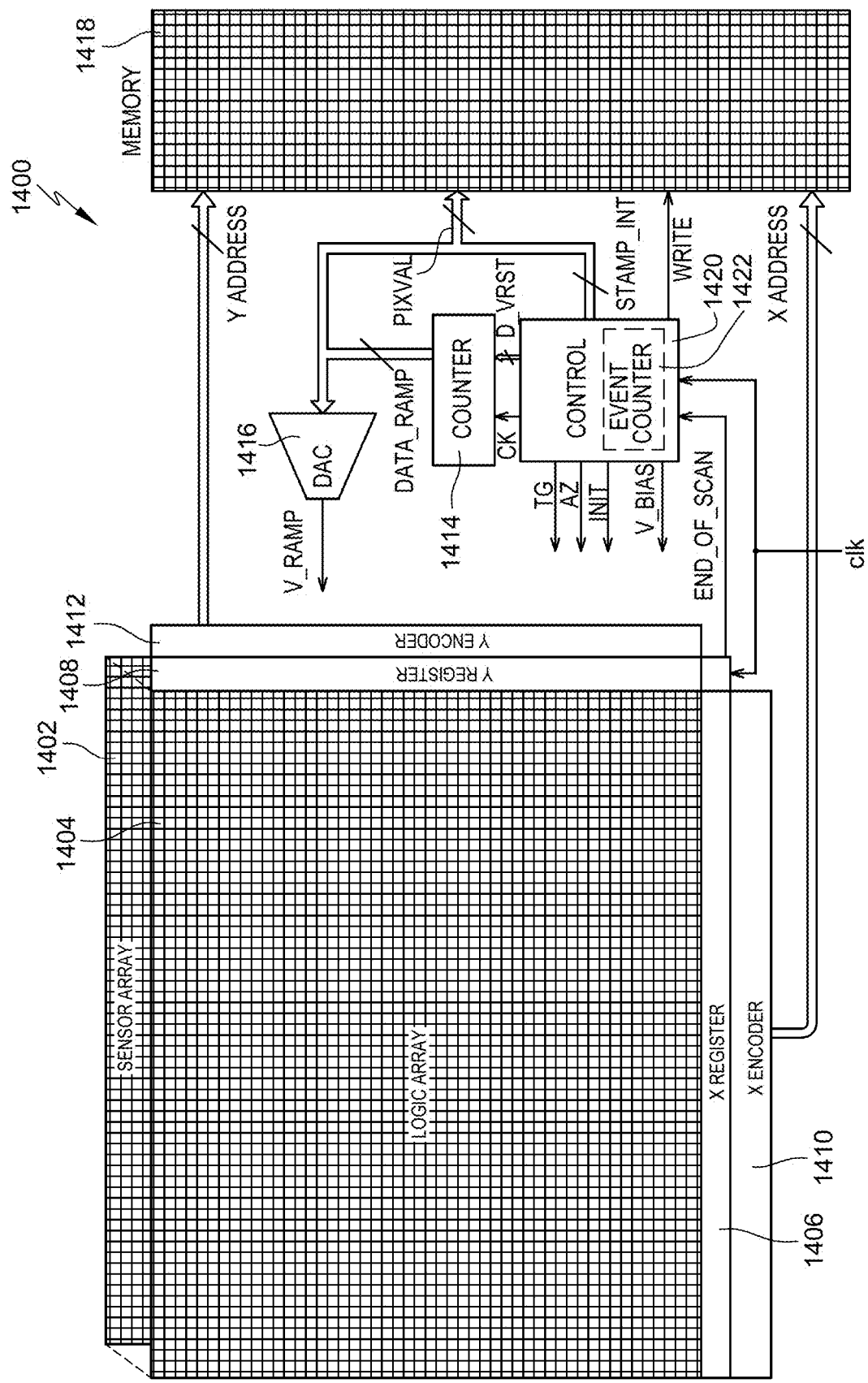
FIG. 14 schematically illustrates an image sensor comprising an array of pixel circuits according to another example embodiment of the present disclosure.

FIG. 14 schematically illustrates an image sensor 1400 comprising an array of pixel circuits according to another example embodiment of the present disclosure. The pixel circuits are for example implemented by the pixel circuit 1100 of FIG. 11 or 12, or by the pixel circuit 1300 of FIG. 13. In particular, the image sensor 1400 for example comprises a sensor array (SENSOR ARRAY) 1402 comprising, for example, one or more tiers that include the sensors 102 and at least part of the comparators of the pixel circuits, and a logic array (LOGIC ARRAY) 1404 stacked on the sensor array 1402, and comprising for example the event signaling circuit 1102 of the pixel circuits, and in some cases part of the comparators 104 of pixel circuits.

The logic array 1404 for example comprises peripheral logic for event logging. In particular, a column event detection circuit (X REGISTER) 1406 is for example coupled to the column signaling lines, such as the columns lines 1204, 1206, of each column of pixel circuits, and a row event detection circuit (Y REGISTER) 1408 is for example coupled to the row signaling lines, such as the row lines 1208, 1210, of each row of pixel circuits. The column and row event detection circuits 1406, 1408 are for example configured to process events signaled by pixel circuits of the array one at a time when they arrive, and to provide arbitration between the events such that all events are correctly processed. For example, the implementation described in US2021/0337150 referenced above can be employed.

A column encoder (X ENCODER) 1410 is for example coupled to the column event detection circuit 1406, and generates a column address X ADDRESS. A row encoder (Y ENCODER) 1412 is for example coupled to the row event detection circuit 1408, and generates a row address Y ADDRESS.

The image sensor 1400 also for example comprises a counter (COUNTER) 1414, which is for example an 8-bit, 10-bit or 12-bit counter, configured to generate the digital ramp signal DATA_RAMP, which is not provided to the pixel circuits of the arrays 1402, 1404, but to a DAC 1416 and to an image memory 1418. The DAC 1416 is configured to convert the digital ramp signal DATA_RAMP into a voltage signal in order to generate the voltage ramp V_RAMP provided to the sensor array 1402, and in particular to the comparator 104 of each of the pixel circuits. The image memory 1418 is for example a memory embedded in the image sensor 1400, or could alternatively be an external memory, that is a memory that is external to the image sensor 1400.

The image sensor 1400 also for example comprises a control circuit (CONTROL) 1420, implemented for example by a finite state machine, and configured to generate the signal INIT, which is provided to the logic array 1404, and in particular to the event signaling circuit 1102 of each pixel circuit, and the signals TG, AZ and V_BIAS, which are provided to the sensor array 1402, and in particular to the sensor 102, auto-zero switch 112, and comparator 104, of each pixel circuit. The control circuit 1420 also for example generates the signal STAMP_INT, which is provided to the image memory 1418, and a clock signal CK and digital signal D_VRST to the counter 1414. The digital signal D_VRST sets an initial value of the counter 1414, and the clock signal CK controls when the counter 1414 increments its count. The control circuit 1420 is for example configured to receive an end of scan signal (END_OF_SCAN) from the column or row event detection circuit 1406 or 1408 indicating when all pixel circuits signaling an event have been processed.

The digital signals DATA_RAMP and STAMP_INT together form a digital value PIXVAL, which is stored to the image memory 1418 under control of a write signal WRITE generated by the control circuit 1420. The value PIXVAL is written to an address in the image memory 1418 designated by the column and row addresses X ADDRESS, Y ADDRESS. For example, the image memory 1418 comprises an address corresponding to each pixel circuit of the array.

While not illustrated in FIG. 14, the image sensor 1400 also for example comprises an output interface allowing the memory 1418 to be read, and/or an image reconstruction device for reconstructing high-dynamic range images, similar to the elements 514 and 516 of FIG. 5.

Operation of the image sensor 1400 will now be described in more detail with reference to the timing diagram of FIG. 15.

Figure 15:
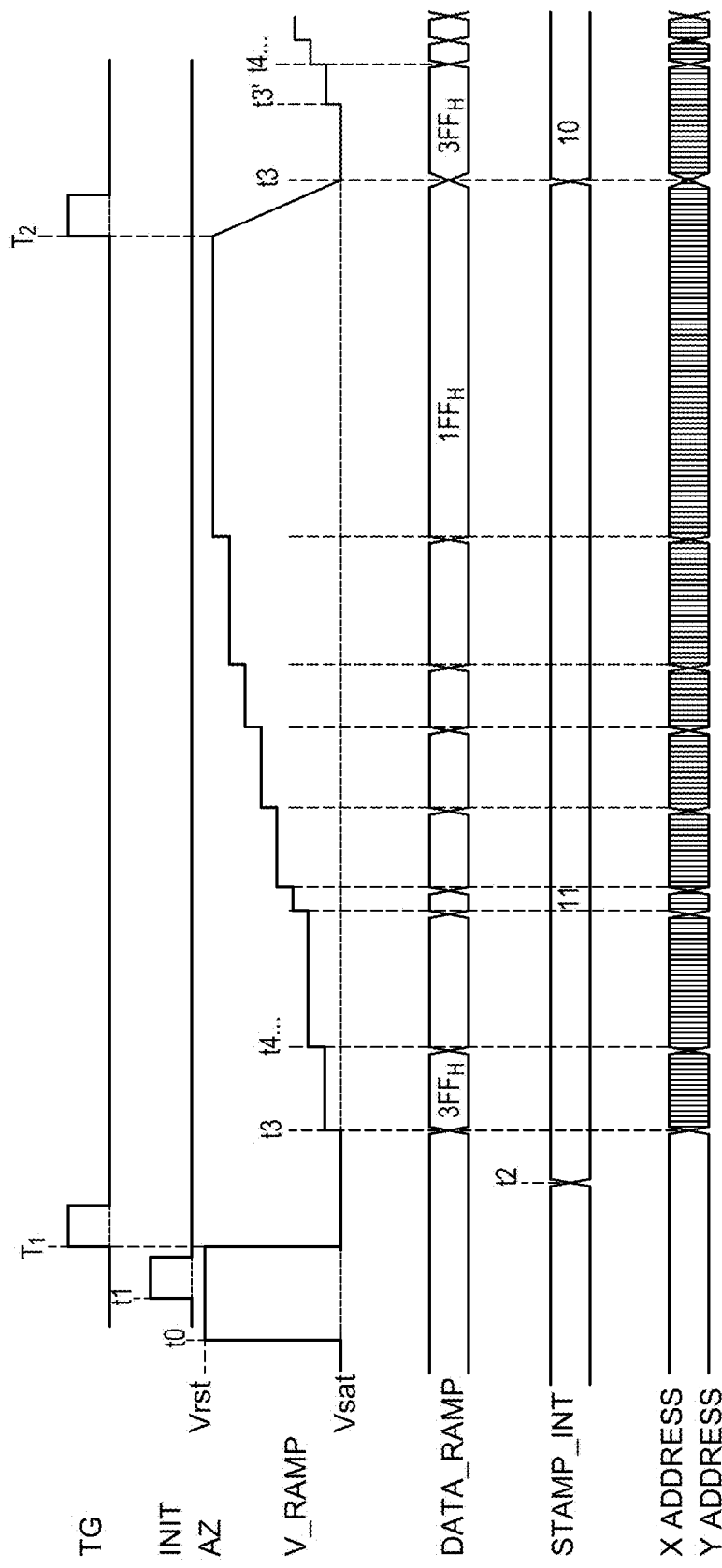
FIG. 15 is a timing diagram representing read phases of the image sensor of FIG. 14 according to an example embodiment of the present disclosure.

FIG. 15 is a timing diagram representing read phases of the image sensor of FIG. 14 according to an example embodiment of the present disclosure. FIG. 15 illustrates in particular the signal TG, the signals INIT and AZ, which are for example the same signal in event driven solution, the signal V_RAMP, the signal DATA_RAMP, the signal STAMP_INT, and the signals X ADDRESS and Y ADDRESS.

Before the first readout cycle, the voltage ramp V_RAMP is for example brought from the voltage level Vsat to the voltage level Vrst at a time t0. The signals INIT and AZ are then pulsed at a time t1 while VRAMP=Vrst for pixel initialization. The signal TG is then pulsed at the start time $T_1$ of a first read phase, and the sense node voltage Vpix is generated at the comparator input.

At a time t2, the digital signal STAMP_INT is for example set to a value associated with the first read phase.

At a time t3, the digital ramp DATA_RAMP and voltage ramp V_RAMP start to increment in steps. For each step, all pixel circuits having their sense node voltage Vpix that is crossed by the voltage ramp V_RAMP generate an event. All the corresponding addresses of these pixel circuits are encoded sequentially, or in parallel, depending on the given architecture, by individually completing the handshake protocol. Those addresses, together with the current digital values DATA_RAMP and STAMP_INT, are readout and/or stored in the image memory 1418, under control of the write signal (WRITE) transmitted by the control circuit 1420 to the memory 1418. For example, the write signal WRITE is asserted in response to each significant edge of a clock signal clk while the end of scan signal END_OF_SCAN is not asserted. The clock signal clk is for example the clock that is used to time the column and row event detection circuits 1406, 1408, and thus indicates the readout rate of the pixel array.

Once there are no more pixel requests to process, the end of scan signal END_OF_SCAN is for example asserted, and the control circuit 1420 is configured to increment the digital ramp signal DATA_RAMP by one step causing the voltage ramp V_RAMP to increase by an equivalent voltage level of one LSB. The cycle then restarts. The amplitude of the digital ramp signal DATA_RAMP and voltage ramp V_RAMP during the successive read phases are for example chosen in a similar manner as described above, all of the ramps for example rising to an intermediate voltage Vm, except the ramp of the final read phase of the frame, which is for example a full-scale ramp.

It should be noted that the variable duration of each step of the voltage ramp V_RAMP could lead, in the case of relatively high illumination levels across the image, to a situation in which the first read phase is not completed by the time $T_2$ at which the second read phase is to begin. Some techniques for addressing this issue will now be described with reference to FIGS. 16 to 20.

Figure 16:
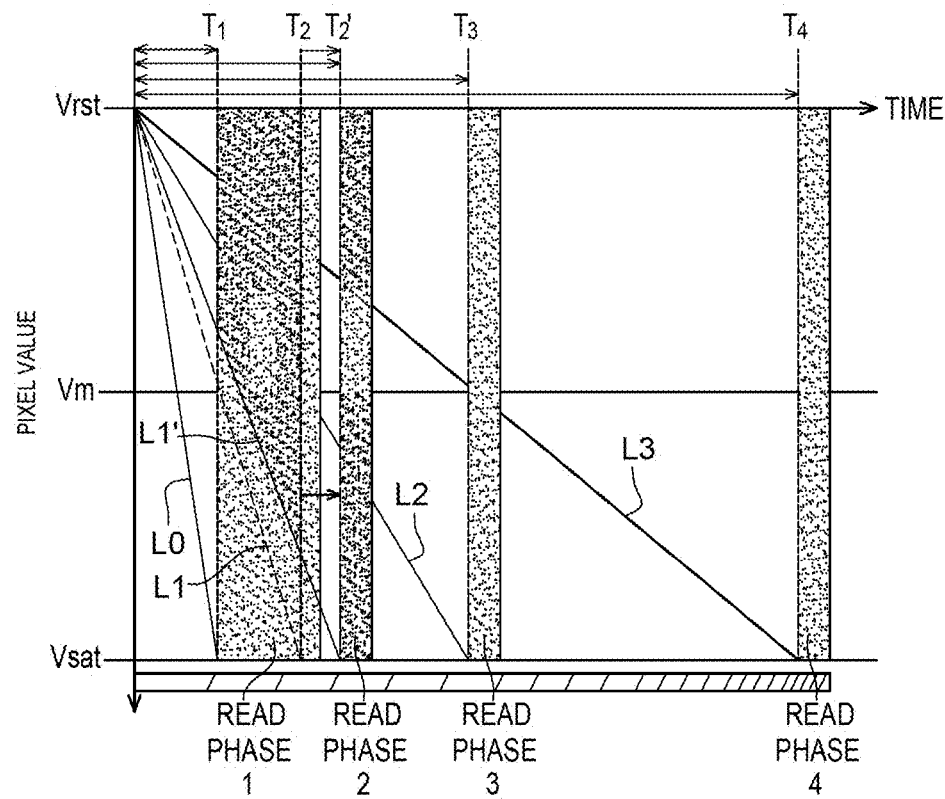
FIG. 16 is another timing diagram representing read phases of the image sensor of FIG. 14 according to an example embodiment of the present disclosure.

FIG. 16 is another timing diagram representing read phases of the image sensor of FIG. 14 according to an example embodiment of the present disclosure. FIG. 16 is similar to the diagram of FIG. 6, except that the read phases of only one frame are illustrated in FIG. 16, and the timing of the second read phase is modified. In particular, if the first read phase extends beyond the start time $T_2$ of the second read phase, the second read phase is delayed to start at a time $T_2'$.

Of course, changing the start of the second read phase implies changing the compression curve used to convert the sense node voltage Vpix into the image pixel value. Furthermore, there is a risk that some pixel circuits could saturate, causing information to be lost.

Figure 17:
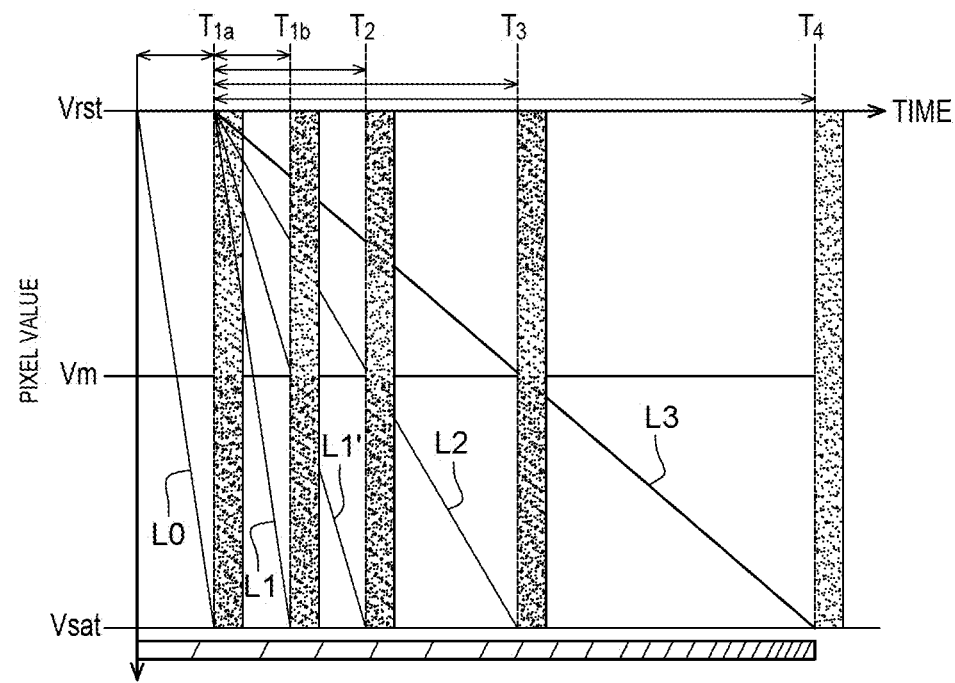
FIG. 17 is another timing diagram representing read phases of the image sensor of FIG. 14 according to a further example embodiment of the present disclosure.

FIG. 17 is another timing diagram representing read phases of the image sensor of FIG. 14 according to a further example embodiment of the present disclosure. FIG. 17 is similar to the timing diagram of FIG. 16, except that, rather than delaying the second read phase, the first read phase is split into two parts a and b at times $T_{1a}$ and $T_{1b}$ respectively. In this case, only the signal AZ is generated at the times $T_{1a}$ and $T_{1b}$, and no INIT is used, the pixels having been read remaining disabled. This approach can work well for certain applications, but for some applications it could lead to the ghost effect for very fast moving scenes, due to the reinitialization by the signal AZ at two different times.

Figure 18:
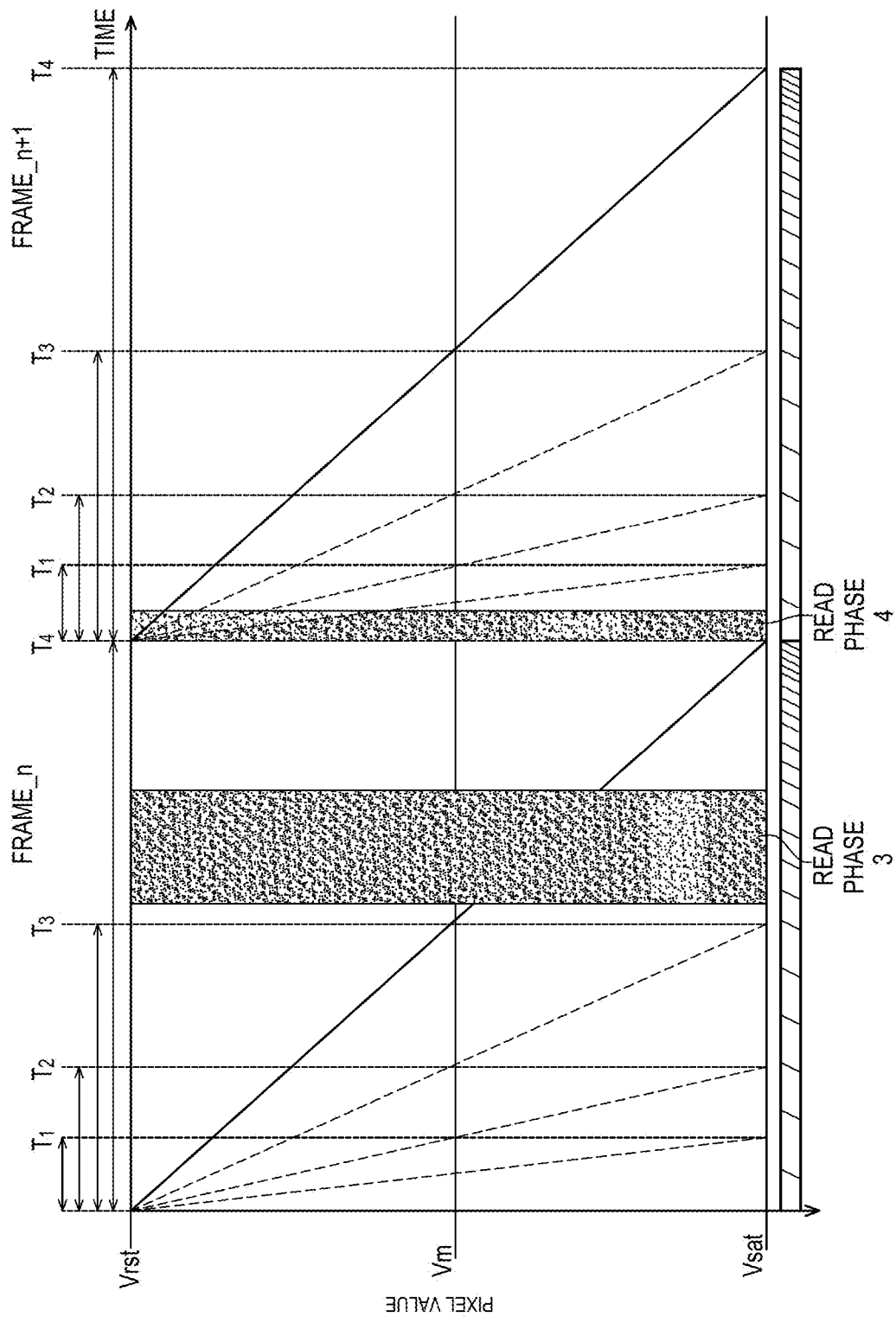
FIG. 18 is another timing diagram representing read phases of the image sensor of FIG. 14 according to yet a further example embodiment of the present disclosure.

FIG. 18 is another timing diagram representing read phases of the image sensor of FIG. 14 according to yet a further example embodiment of the present disclosure. The timing diagram of FIG. 18 is similar to the one of FIG. 6, and illustrates the pixel values (PIXEL VALUES) based on sense node voltages over two consecutive frames n (FRAME_n) and n+1 (FRAME_n+1). However, in the example of FIG. 18, the read phases at times $T_1$ and $T_2$ involve sampling the sense node voltage within each pixel circuit and locally storing the presence of events, without reading out the event using the event signaling circuit. Readout is performed following the third read phase (READ PHASE 3), as there is a greater time interval between the times $T_3$ and $T_4$ within which to perform this operation. The final read phase (READ PHASE 4) for example proceeds like in the previous examples.

Figure 19:
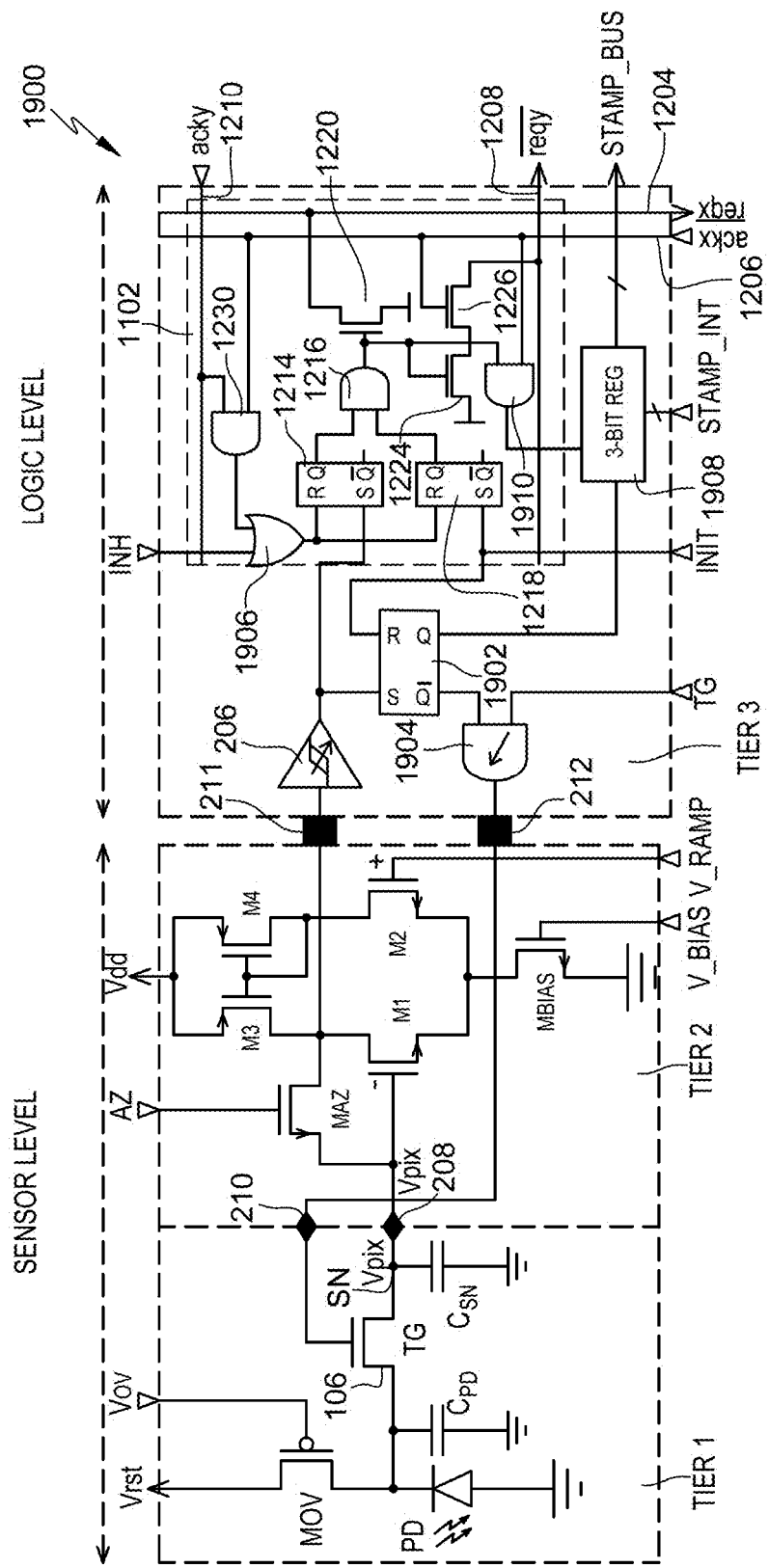
FIG. 19 schematically illustrates a pixel circuit according to yet another example embodiment of the present disclosure.

According to the solution of FIG. 19, the comparator input voltage ramp V_RAMP is for example set to a constant level of Vm during the first and second read phases, and pixels having values between this value and Vsat at the end of each integration time $T_1$, $T_2$ will be stamped with the corresponding STAMP_INT value, and the corresponding TG command is for example disabled until the end of the frame cycle. Therefore, the sense node voltage Vpix is stored at the sense node SN of these pixels until the third read phase at time $T_3$, at which point all of pixels having events at the times $T_1$, $T_2$ or $T_3$ are readout. At the time $T_4$, the remaining pixels can be read with the whole dynamic range applied to the voltage ramp V_RAMP, as explained above. At this time, or optionally once the final read phase has ended, the integration phase of a new frame for example starts.

The local storage within the pixel circuits of the stamp value STAMP_INT is for example performed using an internal register, and logic is also for example added in each pixel in order to disable the arrival of the TG pulse for pixels detecting events during the first and second read phases, as will now be described with reference to FIG. 19.

FIG. 19 schematically illustrates a pixel circuit 1900 according to yet another example embodiment of the present disclosure. The pixel circuit 1900 has many features in common with the pixel circuit 1100 of FIG. 12, and these features are labelled with like reference numerals and will not be described again in detail. However, in the pixel circuit 1900, the comparator output, corresponding for example to the output of the Schmitt trigger 206, is latched by a flip-flop 1902, whose output disables the TG input command arriving at the pixel. For example, the flip-flop 1902 is an RS flip-flop, and an inverter output $\overline{Q}$ of this flip-flop is for example coupled to one input of an AND gate 1904, the other input of which is coupled to the TG line receiving the signal TG. The output of the AND gate 1904 is coupled, for example via the inter-tier connections 212, 210 (instead of the disable signal), to the control input of the transfer gate 106. Therefore, if the sense node voltage Vpix reaches Vm during the first or second read phase, the transfer gate 106 will remain off until a next INIT command. A down-slopping arrow in the Schmitt trigger 206, and an up-sloping arrow in the AND gate 1904, indicate level shifting up or down in order to adapt the two different power supplies. For example, supply and signal levels in tier TIER 3 are relatively low voltages, such as 1 V or 1.2 V, as this tier is for example implemented in an advanced logic process, whereas in tiers TIER 1 and TIER 2, devices are for example implemented according to an analog process with a higher power supply voltage, such as 2.5 V.

An OR gate 1906 is also for example added in the pixel circuit 1900 with respect to the pixel circuit 1200, this OR gate having one input receiving an input signal INH of the pixel circuit, and its other input coupled to the output of the AND gate 1230. This input signal INH, which is generated for example by the control circuit 1420, is for example used in order to disable the event signaling circuit 1102 until readout is to be performed during the third read phase at the time $T_3$.

A 3-bit register (3-BIT REG) 1908 is also added, this register receiving, at a data input, the stamp signal STAMP_INT, and being controlled by the non-inverted output Q of the flip-flop 1902 to store the value of the signal STAMP_INT when an event is detected during the first or second read phase. An output of the register 1908 is coupled to a data bus STAMP_BUS, which is for example common to the pixel circuits of a same row of the array. The register 1908 is for example controlled to output its stored value by an output of an AND gate 1910, which has one of its inputs coupled to the output of AND gate 1216, and its other input coupled to the line 1206 receiving the acknowledgement signal ackx. For example, the data bus STAMP_BUS is a high impedance bus, which can for example be implemented using transistors similar to the transistor 1220 to pull down the voltage on the bus.

One or another of the readout timing solutions described in relation to FIGS. 16 to 19 may be preferable depending on the number of pixel circuits that have high or low illuminance values. In some embodiments of the event-driven architecture, a real-time image histogram is for example generated simultaneously with the image frame capture operation, and used for example to adjust the exposure time ratios and/or readout mode for subsequent frames, as will now be described in more detail with reference to FIG. 20.

Figure 20:
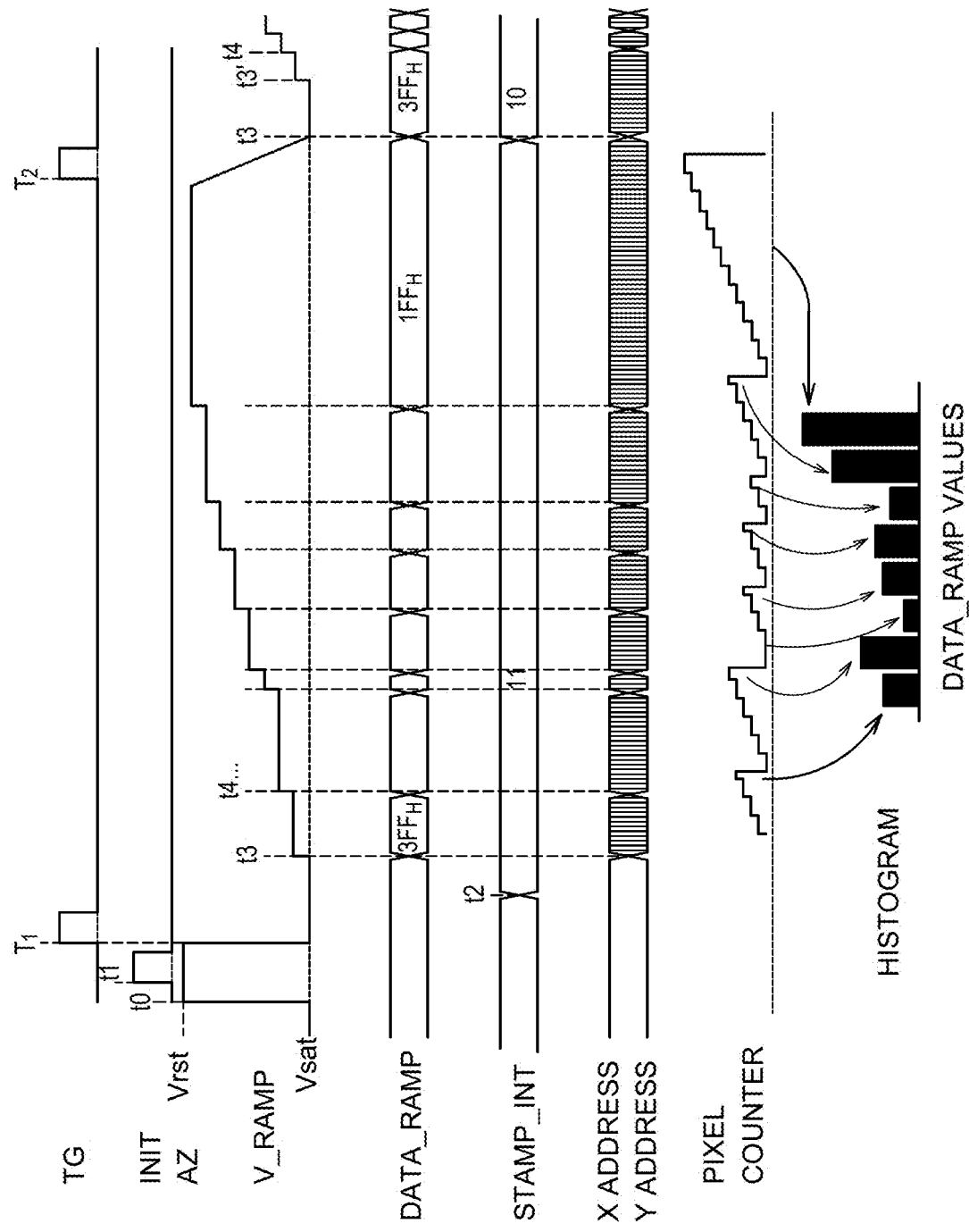
FIG. 20 is a timing diagram representing read phases of the image sensor of FIG. 14 according to yet a further example embodiment of the present disclosure.

FIG. 20 is a timing diagram representing read phases of the image sensor of FIG. 14 according to yet a further example embodiment of the present disclosure. The timing diagram of FIG. 20 is the same as the one of FIG. 15, except that a signal PIXEL COUNTER is added, representing the generation of the image histogram. For example, at each step of the digital ramp signal DATA_RAMP signal during each of the read phases, an event counter is used to count the number of pixel circuits having events occurring at the given level, and when the digit data ramp signal DATA_RAMP is incremented, the count value is for example stored to a memory (not illustrated). For example, this event counter is part of the control circuit 1420 (represented by a dashed block EVENT COUNTER 1422 in FIG. 14), and is incremented each time the write signal WRITE is activated, indicating that an event has been detected. At the end of the frame cycle, the count values reached by each counter for the various levels of the digital ramp signal provide the image histogram (HISTOGRAM), an example of which is represented at the bottom of FIG. 20. This pixel value distribution graph can be used to compute the integration and conversion parameters applied for one or more subsequent image frames. For example, a dedicated processor is used to calculate the next frame configuration.

Common Aspects

An advantage of the pixel circuits and image sensors described herein is that high dynamic range images can be generated without significantly increasing the pixel footprint, and with relatively low power consumption. Furthermore, relatively light post-processing can be performed in order to reconstruct the high dynamic range images based on the read pixel values.

An advantage of performing the analog to digital conversion locally in each pixel and storing the digital pixel values in the local memory as described in relation with FIGS. 1 to 10 is that the pixels are almost immediately read after charge transfer. This feature avoids tightened specifications to cope with, for example, sense node leakage as well as parasitic light sensitivity (PLS), that can be critical in conventional snapshot (global shutter) operation, where the sense node is left floating during a whole frame length that is typically between 10 ms and 20 ms. Since the sense node is a high impedance node, it is also very sensitive to parasitics and noise.

An advantage of resetting and disabling the photodiodes of pixels that have been read is that this avoids saturation of the photodiodes, and the risk that charges from saturated photodiodes migrate to surrounding pixels.

Various embodiments and variants have been described. Those skilled in the art will understand that certain features of these embodiments can be combined and other variants will readily occur to those skilled in the art. For example, while embodiments are described in which a ramp voltage V_RAMP is used to perform analog to digital conversion or event detection, an alternative threshold detection mode could also be implemented in which a constant voltage, for example at the voltage level Vm, is applied instead of the voltage ramp, such that pixels that are illuminated over a corresponding threshold can be detected. This could for example have uses in detecting bright objects such as vehicle headlights, or other signaling lights in the image scene. In the event driven configuration, the added value is that a straightforward pixel address detection that indicates the object position can be achieved, without reading the whole memory.

Furthermore, while certain examples of the reduced ramp amplitudes have been provided, there are many possible values. For example, in one embodiment, a first ramp amplitude could be at 25 percent of the full range, and a second ramp amplitude at 50 percent.

Furthermore, it will be apparent to those skilled in the art that the various circuits could be modified to replace the NMOS transistors by PMOS transistors or vice versa, and different transistor technologies could be used.

Finally, the practical implementation of the embodiments and variants described herein is within the capabilities of those skilled in the art based on the functional description provided hereinabove.

What is claimed is:

1. A pixel circuit of an image sensor, the pixel circuit comprising:
   a pinned photodiode having its cathode coupled to a sense node via a transfer gate;
   a comparator configured:
      to compare, during a first read phase, a first sense node voltage at the sense node, resulting from a first integration period of the pinned photodiode, with a first voltage ramp and to generate an event signal if the voltage of the first voltage ramp crosses the first sense node voltage; and
      if the voltage of the first voltage ramp does not cross the first sense node voltage during the first read phase, to compare, during a second read phase, a second sense node voltage at the sense node, resulting from the first integration period and a second integration period of the pinned photodiode, with a second voltage ramp and to generate an event signal when the voltage of the second voltage ramp crosses the second sense node voltage; and an event signaling circuit configured to signal the generation of the event signal during the first or second read phase to event logging circuitry, the transfer gate being activated by a first activation pulse at the start of the first read phase and by a second activation pulse at the start of the second read phase, the voltage at the sense node not being reset between the first and second read phases.

2. The pixel circuit of claim 1, wherein the event signaling circuit is further configured to disable the comparator during the second read phase if the event signal is generated during the first read phase.

3. The pixel circuit of claim 1, wherein the second ramp signal has a greater amplitude than the amplitude of the first ramp signal.

4. The pixel circuit of claim 1, further comprising a reset transistor coupling the cathode of the photodiode to a reset voltage rail, wherein the event signaling circuit is further configured to activate the reset transistor in response to the event signal being generated by the comparator during the first or second read phase.

5. The pixel circuit of claim 4, further comprising a logic device coupled to the output of the comparator and configured to disable the transfer gate in response to the generation of the event signal during the first or second read phase.

6. An image sensor comprising:
an array formed of a plurality of the pixel circuit of claim 1;
a counter configured to generate a digital ramp, and to supply the digital ramp to an image memory; and
a digital to analog converter configured to convert the digital ramp into the first voltage ramp during the first read phase and into the second voltage ramp during the second read phase.

7. The image sensor of claim 6, further comprising an image reconstruction device configured to reconstruct an image by generating:
a first pixel value of the image based on a first value of the digital ramp associated with a first of the plurality of pixel circuits; and
a second pixel value of the image based on a second value of the digital ramp associated with a second of the plurality of pixel circuits and based on the relative durations of the first and second integration periods.

8. The image sensor of claim 6, further comprising a control circuit configured, during the first and second read phases, to pause the incrementation of the counter at each count value of the digital ramp until a corresponding end of scan signal is asserted by the event logging circuitry indicating that all of the pixel circuits generating the event signal corresponding to the count value have been read.

9. The image sensor of claim 8, wherein the control circuit is configured to delay a start of the second read phase until all of the pixel circuits having events have been read during the first read phase.

10. The image sensor of claim 8, wherein the control circuit is configured to implement the first read phase in two parts, a first part after a first integration time, and a second part after a second integration time.

11. The image sensor of claim 8, wherein the control circuit is configured to generate an image histogram by counting the number of pixel circuits signaling events during each count value of the counter.

12. The image sensor of claim 6, wherein the image memory is further configured to receive a digit signal having a first value during the first read phase and a second value during the second read phase, the image memory being configured to store, in response to the event signal from one of the pixel circuits during the first or second read phase, the value of the digit signal.

13. The image sensor of claim 6, wherein each pixel circuit further comprises a register coupled to the output of the comparator and configured to store, in response to the generation of the event signal, a digital signal having a first value during the first read phase and a second value during the second read phase.

14. The image sensor of claim 6, comprising first and second stacked tiers, each of the pixel circuits of the array comprising a sensor comprising the pinned photodiode and sense node of each pixel circuit, the sensor being formed in the first tier, and part of the comparator being formed in the second tier.

15. The image sensor of claim 14, wherein the event signaling circuit is formed in the second tier, or in a third tier of the image sensor stacked with the first and second tiers.

16. A method of reading a pixel circuit of an image sensor, the pixel circuit comprising a pinned photodiode having its cathode coupled to a sense node via a transfer gate, the method comprising:
comparing, by a comparator during a first read phase, a first sense node voltage at the sense node, resulting from a first integration period of the pinned photodiode, with a first voltage ramp and generating, by the comparator, an event signal if the voltage of the first voltage ramp crosses the first sense node voltage;
if the voltage of the first voltage ramp does not cross the first sense node voltage during the first read phase, comparing, by the comparator during a second read phase, a second sense node voltage at the sense node, resulting from the first integration period and a second integration period of the pinned photodiode, with a second voltage ramp and generating an event signal when the voltage of the second voltage ramp crosses the second sense node voltage; and
signaling, by an event signaling circuit, the generation of the event signal during the first or second read phase to event logging circuitry, wherein the transfer gate is activated by a first activation pulse at the start of the first read phase and by a second activation pulse at the start of the second read phase, the voltage at the sense node not being reset between the first and second read phases.

17. The method of claim 16, further comprising:
receiving, by an image memory of the image sensor, a digital ramp; and
storing, at an address of the image memory associated with the pixel circuit and in response to the event signal of the comparator during the first or second read phase, a value of the digital ramp to form pixel data (DATA_PIX) of the pixel.

* * * * *